(12) United States Patent
Katsumata et al.

(10) Patent No.: US 7,243,241 B1
(45) Date of Patent: Jul. 10, 2007

(54) DATA DISTRIBUTING APPARATUS AND TERMINAL APPARATUS FOR DATA DISTRIBUTION

(75) Inventors: Yasushi Katsumata, Kanagawa (JP); Masayuki Ohbayashi, Kanagawa (JP); Takashi Nakatsuyama, Chiba (JP); Han Min-Jae, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/462,615

(22) PCT Filed: May 10, 1999

(86) PCT No.: PCT/JP99/02404

§ 371 (c)(1),
(2), (4) Date: Jan. 10, 2000

(87) PCT Pub. No.: WO99/59092

PCT Pub. Date: Nov. 18, 1999

(30) Foreign Application Priority Data

Nov. 5, 1998 (JP) ................................. 10/127227

(51) Int. Cl.
*H04L 9/32* (2006.01)

(52) U.S. Cl. ..................... 713/193; 709/203; 380/278

(58) Field of Classification Search ................ 713/193, 713/201, 190; 709/235, 201, 203; 375/240; 725/82; 705/52, 1, 51; 726/2; 707/104.1; 380/278

See application file for complete search history.

(56) References Cited

U.S. PATENT DOCUMENTS

| 5,737,416 | A | * | 4/1998 | Cooper et al. ............. 705/52 |
| 5,742,686 | A | | 4/1998 | Finley ..................... 380/28 |
| 5,818,512 | A | * | 10/1998 | Fuller ..................... 725/82 |
| 5,931,947 | A | * | 8/1999 | Burns et al. .............. 713/201 |
| 6,002,720 | A | * | 12/1999 | Yurt et al. ................. 375/240 |
| 6,070,141 | A | * | 5/2000 | Houvener et al. ............ 705/1 |

FOREIGN PATENT DOCUMENTS

| EP | 0715247 | 11/1995 |
| WO | 9730575 | 8/1997 |

* cited by examiner

*Primary Examiner*—Kim Vu
*Assistant Examiner*—T. B. Truong
(74) *Attorney, Agent, or Firm*—Lerner, David, Littenberg, Krumholz & Mentlik, LLP

(57) ABSTRACT

A contents database in which data of contents enciphered by a C key is stored and provided for a contents server, wherein the contents data enciphered by the C key are enciphered by an M key and sent to a user machine. In the user machine, the contents data enciphered by the C key are stored in a storage device. Upon reproduction, the contents data enciphered by the C key from the storage device are sent to an enciphering/decoding processing unit and decoded and charging is performed in accordance with the C key. A dynamic authenticating code which dynamically changes with the elapse of time is added to the C key.

37 Claims, 14 Drawing Sheets

| Fig. 8A |
| Fig. 8B |

DATA DISTRIBUTING APPARATUS AND TERMINAL APPARATUS FOR DATA DISTRIBUTION

TECHNICAL FIELD

The invention relates to an information distributing system comprising: a contents server in which, for example, a plurality of music data is accumulated; and a user machine to which desired contents is distributed from contents accumulated in the contents server. Particularly, the invention relates to a protection and charging of contents.

BACKGROUND ART

In recent years, various services using a computer network are being realized owing to the spread of Internet and a satellite communication. As one of the services using such a computer network, a system for performing the following music distributing service has been proposed.

In FIG. 14, reference numeral 501 denotes a contents server and 502 indicates a user machine. A plurality of music data has been accumulated as contents in the contents server 501. A storage device 504 such as hard disk drive, optical disk drive, or the like is connected to the user machine 502 and a card reader/writer 505 for charging is also connected thereto. A card 506 is loaded into the card reader/writer 505.

In case of using the music distributing service, the user machine 502 is connected to the contents server 501 through a transmission path 503. The transmission path 503 is, for example, a computer network such as Internet. When the user machine 502 is connected to the contents server 501, a list of contents or a search picture plane is sent from the contents server 501 to the user machine 502.

The user searches desired contents by the list of contents or search picture plane and selects contents to be downloaded. When the user selects the contents, a requesting command of the contents is sent from the user machine 502 to the contents server 501. In the contents server 501, the contents is taken out in response to the requesting command and this contents is transmitted from the contents server 501 to the user machine 502. The contents is stored into the storage device 504 of the user machine 502. At this time, proper charging is performed by the card reader/writer 505.

If such a music distributing system is spread, the user can easily obtain the music data of a desired music piece via a communication. A server in such a system is equipped with a searching function. By using such a searching function, the user can easily search a desired music piece and obtain it. Further, in the server in such a system, since the music data is always updated, a latest music piece can be early obtained.

However, in a system such that the music data is distributed from the server to the user machine as mentioned above, there is a danger that the data of the contents is copied without permission and the right of author is not protected. Therefore, it is necessary to add a function for prevention of copy so that the data of the contents is not copied without permission and to perform proper charging for the contents.

In such a system, it is considered to reproduce the downloaded music data by another equipment or transfer it to other people. If the system is constructed so that the data of the contents is always moved to only one equipment, there is no possibility that an illegal copy is distributed. However, if the copy to the other equipment is perfectly inhibited, such a movement of the data of the contents cannot be performed as well.

In a system which can distribute contents, therefore, it is an object of the invention to provide an information distributing system which can sufficiently protect the contents and perform legal charging.

DISCLOSURE OF INVENTION

According to the invention, there is provided a data distributing apparatus comprising:

a first storing unit in which first identification data that is peculiar to equipment and second identification data corresponding to the first identification data have been stored;

a first transmitting/receiving unit for transmitting distribution request data of data together with the first identification data read out from the first storing unit and receiving the transmitted data;

a first data storing unit for storing the data received by the first transmitting/receiving unit;

a first signal processing unit for performing a decoding process to the data read out from the first data storing unit on the basis of the second identification data stored in the first storing unit;

a first control unit for performing an operation to allow the data received by the first transmitting/receiving unit to be stored into the first data storing unit and controlling the decoding processing operation by the first signal processing unit of the data read out from the first data storing unit;

a second transmitting/receiving unit for receiving the first identification data and the distribution request data which were transmitted from the first transmitting/receiving unit and transmitting the data;

a second data storing unit in which a plurality of data is stored and which outputs data corresponding to the distribution request data;

a second storing unit in which the second identification data corresponding to the transmitted first identification data has been stored;

a second signal processing unit for performing an enciphering process to the data outputted from the second data storing unit on the basis of the second identification data read out from the second storing unit; and a second control unit for performing a reading control of the second identification data from the second storing unit on the basis of the distribution request data and the first identification data which were transmitted and performing a reading control of the data from the second data storing unit on the basis of the distribution request data, wherein the data enciphered on the basis of the second identification data transmitted through the second transmitting/receiving unit is decoded by the first signal processing unit.

According to the invention, there is provided a data distributing apparatus comprising:

at least one terminal equipment section having a first storing unit in which first identification data that is peculiar to equipment and second identification data corresponding to the first identification data have been stored, a first transmitting/receiving unit for transmitting distribution request data of data together with the first identification data read out from the first storing unit and receiving the transmitted data, a first storing unit for storing the data received by the first transmitting/receiving unit, a first signal processing unit for performing a decoding process to the data read out from the first data storing unit on the basis of the second identification data stored in the first storing unit, and a first control unit for performing an operation to allow the data received by the first transmitting/receiving unit to be stored into the first data storing unit and controlling the decoding processing operation by the first signal processing unit of the data read out from the first data storing unit; and a server apparatus section having a second transmitting/receiving unit, connected to the terminal equipment section through a transmission path, for receiving the first identification data and the distribution request data which were transmitted from the first transmitting/receiving unit and transmitting the data, a second data storing unit in which a plurality of data is stored and which outputs data corresponding to the distribution request data, a second storing unit in which the second identification data corresponding to the transmitted first identification data has been stored, a second signal processing unit for performing an enciphering process to the data outputted from the second data storing unit on the basis of the second identification data read out from the second storing unit, and a second control unit for performing a reading control of the second identification data from the second data storing unit on the basis of the distribution request data and the first identification data which were transmitted and performing a reading control of the data from the second storing unit on the basis of the distribution request data, wherein the data enciphered on the basis of the second identification data transmitted through the second transmitting/receiving unit is decoded by the first signal processing unit.

According to the invention, there is provided a terminal apparatus for data distribution, comprising:

a storing unit in which first identification data that is peculiar to an apparatus and second identification data corresponding to the first identification data have been stored;

a data transmitting/receiving unit for transmitting distribution request data of data together with the first identification data read out from the storing unit and receiving data which was enciphered by the second identification data and transmitted;

a data storing unit for storing the data which was enciphered on the basis of the second identification data and received by the data transmitting/receiving unit;

a signal processing unit for performing a decoding process to the data read out from the data storing unit on the basis of the second identification data stored in the storing unit; and a control unit for performing the operation to store the data received by the data transmitting/receiving unit into the data storing unit and controlling the decoding processing operation by the signal processing unit of the data read out from the data storing unit.

BEST MODE FOR CARRYING OUT THE INVENTION

Figure 1:
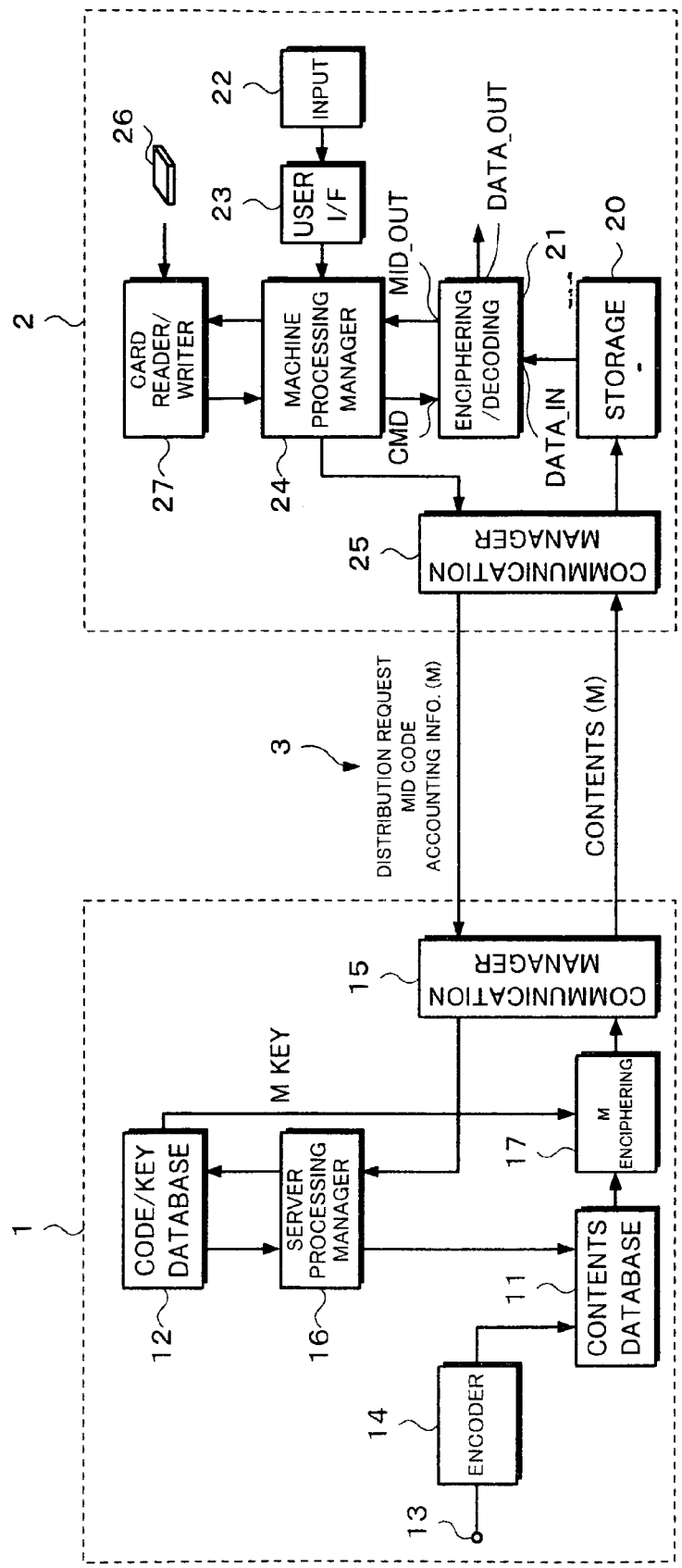
FIG. 1 is a block diagram for use in explanation of a system using an M key in a data distributing system to which the invention can be applied.

Embodiments of the invention will now be described hereinbelow with reference to the drawings. According to the invention, in a system for transferring data of contents, the data of contents can be protected and proper charging can be performed. Enciphering keys and codes which are used in the system will be first simply described.

1. Description of Keys and Codes

In the system to which the invention is applied, the following enciphering keys and codes are used.

(1) M Key

A role of an M (Machine) key is to enable data to be used only by specific equipment, namely, a user machine, which will be described hereinlater. The M key is allocated to each equipment at the time of, for example, shipping the equipment from a factory and is enciphering information peculiar to each equipment. In order to protect the M key, it is embedded in, for example, an enciphering/decoding processing unit of the equipment and cannot be extracted to the outside of the equipment.

(2) MID Code

A peculiar MID (Machine Identification) code is allocated to each equipment. The MID code is also allocated to each equipment at the time of shipment from the factory. The MID code is used only to specify each equipment and is not directly used as an enciphering key. Therefore, even if it leaks to the outside, a risk that the data protection is not guaranteed is small. The MID code can be embedded in, for example, the enciphering/decoding processing unit of the equipment in a manner similar to the M key or can be stored in the other ROM or EEPROM.

(3) C Key

A role of a C (Contents) key is to protect data every contents. In this instance, the contents denotes a unit of a group of movable information. That is, in a system for charging for data, the contents indicates a unit of information as a target of charging. In case of a music server, when the charge is performed every music piece, a unit such as music data of each music piece indicates data of one contents.

Each contents is enciphered by using the C key that is peculiar to each contents. Therefore, only in the equipment of the user side having the C key corresponding to the contents, the encryption of the contents can be decoded by using the C key and reproduced. As mentioned above, since the contents can be used only in the equipment of the user side having the C key, the C key can be also regarded as a key indicating the right in which the contents can be used.

(4) T Key

A role of a T (Transfer) key is to protect data when the data is moved between user equipment. When the contents is moved between the equipment, there is a possibility that the C key leaks to the outside. Therefore, when data is moved between the equipment, the C key and the contents enciphered by the C key are further enciphered by the T key.

The T key is an algorithm which has been predetermined between equipment on the data receiving side and equipment on the data sending side and formed on the basis of the MID code. That is, when data of contents is moved between the equipment, the MID code on the receiving side is transmitted from the equipment on the receiving side to the equipment on the sending side. The T key is formed on the basis of the transmitted MID code in the equipment on the sending side. In the equipment on the receiving side, the T key is formed on the basis of its own MID code by a similar algorithm.

(5) DA Code

It is a dynamic authenticating code which is formed in an enciphering/decoding chip and is added to the C key. The DA code is formed by using, for example, a random number, time code, and the like. If the DA code is added, by temporarily shunting the C key, it becomes impossible to illegally use the contents. By using the DA code, it is possible to permit/inhibit the use for a predetermined period of time or lend or borrow the contents.

2. System Using the M Key

FIG. 1 shows an example of a data distributing system to which the invention is applied. In this example, an enciphering key called an M key is introduced, thereby enabling data to be used only by specific terminal equipment.

In FIG. 1, a contents server 1 is connected to a user machine 2 through a transmission path 3. Although only one user machine 2 as terminal equipment which is connected to the contents server 1 through the transmission path 3 is shown in FIG. 1 in order to simplify the description, a plurality of user machines 2 are actually connected to the server 1 via the transmission path 3. A contents database 11 is provided for the contents server 1. Data of contents presented by the contents server 1 has been stored in the contents database 11.

The data of contents to be stored into the contents database 11 is inputted and supplied from a contents input terminal 13. For example, in case of a server for performing a music distributing service, music data is supplied from the contents input terminal 13. The music data is supplied to an encoder 14. The music data is compression encoded by the encoder 14 on the basis of a modified DCT (Modified Discrete Transform), namely, what is called ATRAC (Adaptive Transform Acoustic Coding) disclosed in, for example, JP-A-3-139923, JP-A-3-139922, or the like. The compressed music data is stored in the contents database 11.

A code and key database 12 constructed by an RAM and a hard disk drive is provided for the contents server 1. The MID codes and the M keys of the user machines 2 serving as all equipment connected to the contents server 1 are stored in the code and key database 12. The MID code is information peculiar to each user machine in order to identify each user machine 2. The M key is the enciphering key peculiar to each user machine. The MID code and M key are allocated to each user machine 2, for example, at the time of shipment of the equipment from the factory. When the MID code and the M key are allocated to each user machine 2 at the time of shipment from the factory, data to be stored in the code and key database 12 is formed on the basis of the list of the MID code and M key allocated to each equipment.

The whole operation of the contents server 1 is managed by a server processing manager 16. A communication control of the contents server 1 is managed by a communication manager 15. The data from the contents server 1 is enciphered by an enciphering circuit 17. The encipherment at that time is performed on the basis of the M key retrieved from the code and key database 12 on the basis of the MID code transmitted from the user machine 2.

On the other hand, an enciphering/decoding processing unit 21 is provided for the user machine 2 as terminal equipment. The enciphering/decoding processing unit 21 is constructed by an exclusive-use IC for performing an enciphering process of data and a decoding process of the encryption. An MID code and an M key which are peculiar to the equipment are stored in the enciphering/decoding processing unit 21 at the time of shipment from the factory.

Figure 2:
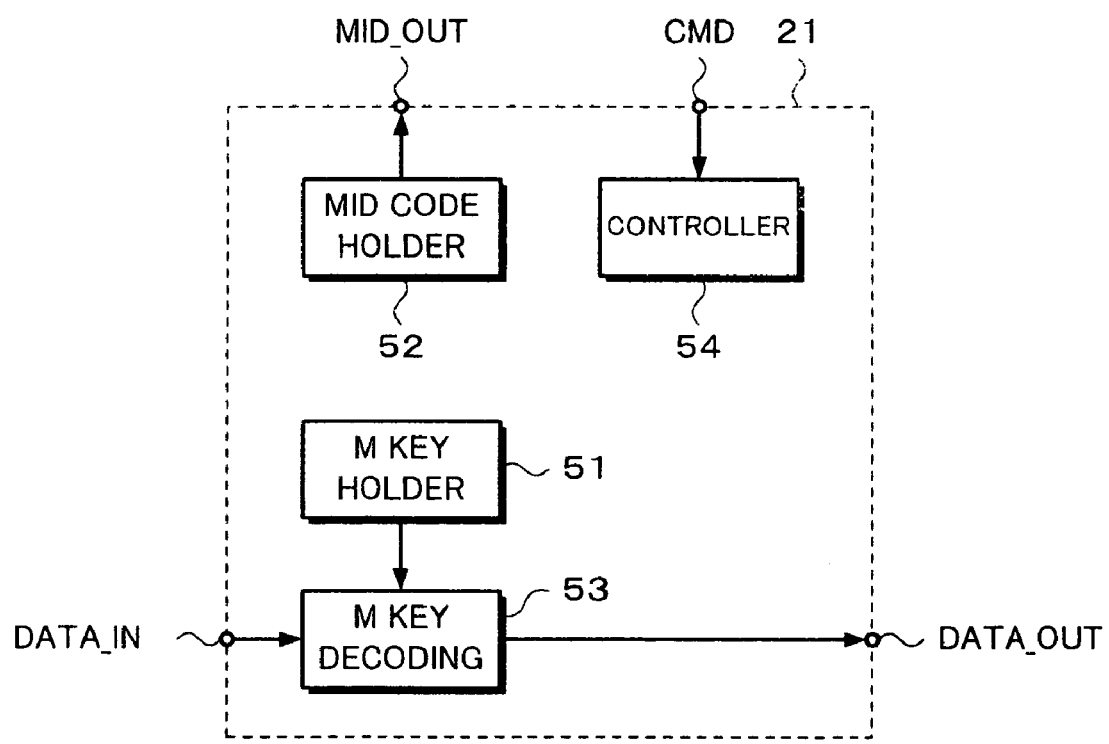
FIG. 2 is a block diagram for use in explanation of an enciphering/decoding processing unit of the system using the M key in the data distributing system to which the invention can be applied.

FIG. 2 shows a construction of the enciphering/decoding processing unit 21. The enciphering/decoding processing unit 21 comprises: an M key holder 51; an MID code holder 52; an M key decoding circuit 53; and a controller 54. An M key as enciphering information peculiar to each equipment is stored in the M key holder 51 at the time of shipment from the factory. An MID code as identification information peculiar to each equipment is stored in the MID code holder 52 at the time of shipment from the factory. The controller 54 controls the operation of the enciphering/decoding processing unit 21.

A command which is transmitted from a machine manager, which will be described hereinlater, is supplied to a command terminal CMD of the controller 54. The operation of the enciphering/decoding processing unit 21 is set on the basis of the command. The data of the contents enciphered by the M key is supplied to the M key decoding circuit 53 through an input terminal DATA_IN. The M key is supplied from the M key holder 51 to the M key decoding circuit 53. The M key decoding circuit 53 deciphers the encryption of the data of contents supplied from the input terminal DATA_IN. Output data of the M key decoding circuit 53 is generated from a data output terminal DATA_OUT. A code output terminal MID_OUT is led out from the MID code holder 52. An MID code is outputted from the code output terminal MID_OUT.

As shown in FIG. 2, the enciphering/decoding process is performed by the enciphering/decoding processing unit 21 constructed by an IC of one chip. The M keys and MID codes have been stored in the enciphering/decoding processing unit 21. Therefore, it is impossible from the outside to solve how the enciphering process was performed in the enciphering/decoding processing unit 21 and what is the enciphering key.

In FIG. 1, an input as a result operated by the user is supplied from an input unit 22 to the user machine 2. The input from the input unit 22 is supplied to a machine processing manager 24 through a user interface 23.

The machine processing manager 24 is constructed by a microcomputer or the like and performs the whole process of the user machine 2. When receiving the input to obtain the contents of the contents server 1 from the input unit 22, the machine processing manager 24 supplies a command to the enciphering/decoding processing unit 21 and performs the operation for inquiring the MID code. When the command to inquire the MID code is supplied, the enciphering/decoding processing unit 21 generates the MID code stored in the MID code holder 52 (FIG. 2) to the manager 24 in response to the supplied command to inquire the MID.

When the MID code is received from the enciphering/decoding processing unit 21, the machine processing manager 24 transmits a distributing request, the MID code, and accounting information to a communication manager 25. The distributing request, MID code, and accounting information are transmitted from the communication manager 25 of the user machine 2 to the communication manager 15 of the contents server 1 via the transmission path 3.

When a distribution service of the data of the contents from the contents server 1 is received, a card 26 is loaded. Balance information of the card 26 is sent to the machine processing manager 24 through a card reader/writer 27. When the distribution of the contents is executed, the machine processing manager 24 generates a drawing instruction or a reducing instruction to the card 26 via the card reader/writer 27, and the cost corresponding to the distribution of the contents is deducted from the card 26. In this manner, payment of the cost for the distribution of the contents is performed to a company which distributed the contents. At that time, it is also possible to discriminate whether he is a legal user or not and whether the user has certainly performed the charging or not and, thereafter, output the M key corresponding to the MID code transmitted from the user machine 2.

On the contents server 1 side, the server processing manager 16 constructed by a microcomputer or the like controls the whole processes of the server 1. When the communication manager 15 receives the distributing request, MID code, and accounting information which are transmitted from the user machine 2, the received distributing request, MID code, and accounting information are sent to the server processing manager 16.

When the MID code transmitted from the user machine 2 is received, the server processing manager 16 sends the MID code to the code and key database 12 and supplies the command to inquire the M key of the user machine corresponding to the MID code transmitted from the user machine 2 to the database 12. As mentioned above, the MID code of each equipment connected to the server 1 and the information of the M key corresponding to the MID code have previously been stored in the code and key database 12. When the MID code transmitted from the manager 16 is received, the code and key database 12 identifies the user machine 2 from the transmitted MID code and outputs the M key corresponding to the user machine 2 which transmitted the MID code. The M key corresponding to the transmitted MID code is sent to the M key enciphering circuit 17. An enciphering key is set to the M key enciphering circuit 17 on the basis of the M key transmitted from the database 12.

When the distributing request from the user machine 2 is received, the server processing manager 16 sends a command indicative of the distributing instruction of the requested contents to the contents database 11. When the distributing instruction from the user machine 2 is received, the contents database 11 reads out the data of the contents corresponding to the transmitted distributing instruction. The data of the contents read out from the database 11 is sent to the M key enciphering circuit 17.

The M key corresponding to the MID code of the equipment of the user machine 2 which requested the data has been set in the M key enciphering circuit 17 from the code and key database 12. The data of the contents which is transmitted from the contents database 11 is enciphered by the M key enciphering circuit 17 by the M key corresponding to the MID code of the user machine 2 mentioned above. The data of the contents enciphered by the M key is transmitted from the communication manager 15 of the contents server 1 to the communication manager 25 of the user machine 2 through the transmission path 3. The data of the contents is accumulated in a storage device 20 in the user machine 2. In this case, a wire or radio communication network such as an ISDN (Integrated Services Digital Network) or the like can be used as a transmission path 3.

As mentioned above, when the distribution of the contents is requested from the user machine 2 to the contents server 1, the MID code peculiar to the equipment of the user machine 2 is sent from the user machine 2 to the contents server 1. The code and key database 12 is provided for the contents server 1. The M key which corresponds to the MID code of the user machine 2 and was sent from the user machine 2 is called from the code and key database 12. The data of the contents read out from the database 11 is enciphered by the M key. The data of the contents enciphered by the M key that is peculiar to the user machine 2 is sent to the user machine 2. The data of the contents which was enciphered is accumulated in the storage device 20 of the user machine 2. Since the data of the contents stored in the storage device 20 has been enciphered by the M key peculiar to the equipment of the user machine 2, the distributed data of the contents cannot be decoded by equipment other than the user machine 2 which requested the distribution of the contents. Thus, the copyright of the contents which is distributed from the server 1 to the user machine 2 can be protected.

That is, in case of decoding the data of the contents stored in the storage device 20, the read-out data of the contents is supplied from the storage device 20 to the data input terminal DATA_IN of the enciphering/decoding processing unit 21 in FIG. 2. As shown in FIG. 2, the M key peculiar to the equipment of the user machine 2 has been accumulated in the M key holder 51 of the enciphering/decoding processing unit 21. Since the data of the contents sent from the contents server 1 has been enciphered by the M key corresponding to the MID code in the MID code holder 52, the M key set in the M key enciphering circuit 17 on the contents server 1 side is similar to the M key stored in the M key holder 51 of the user machine 2. Therefore, the data of the contents which was read out from the storage device 20 and enciphered by the M key can be decoded by the enciphering/decoding processing unit 21.

On the other hand, it is now assumed that the data of the contents stored in the storage device 20 was copied to a user machine or equipment other than the user machine 2. The data of the contents stored in the storage device 20 has been enciphered by the M key peculiar to the equipment of the user machine 2. The enciphering/decoding processing unit 21 of the other equipment does not have the same M key as that of the equipment of the user machine 2 serving as a copying source. Therefore, even if the data of the contents stored in the storage device 20 is copied into the equipment other than the user machine 2 in which the data of the contents transmitted from the server 1 has been stored by sending a distributing request to the inherent user machine 2, namely, server 1, the encryption of the data of the contents cannot be decoded in the equipment serving as a copying source.

3. System Using the C Key

By introducing the M key shown in FIGS. 1 and 2, the data of the contents can be used by only the specific equipment. However, if only the M key is used, the data of the contents cannot be moved at all from the user machine in which the data of the contents distributed from the server 1 has been stored to the other user machine or equipment. Although there is considered a case where the right of the author is not protected if the data of the contents is copied as much as possible, if the data of the contents was merely moved, since this means that the equipment which uses the data of the contents is merely shifted to the other equipment, no problem occurs. As shown in FIGS. 1 and 2 mentioned above, according to the apparatus and method using only the M key, it is impossible to cope with the shift from certain equipment of the data of the contents to the other equipment, namely, from a certain user machine to the other user machine as mentioned above. There is considered a situation that an error occurs in the data of the contents once stored in the user machine or the download of such data fails. In such a case, if the legal user performed the legal charging and received the distribution of the data of the contents, it is desired to redistribute the data of the contents. The contents include toll contents and toll-free contents and if only the M key is used, it is impossible to perform the proper charging in accordance with the kind of contents.

As mentioned above, by introducing the M key, the protection of the data of the contents for each user machine as each equipment as a unit and the protection for the copy of the illegal contents data can be accomplished. However, if only the M key is used, it is insufficient to protect the data of each contents and perform the proper charging. Therefore, an example in which a C key to encipher every contents is introduced will now be described with reference to FIG. 3 and subsequent drawings.

Figure 3:
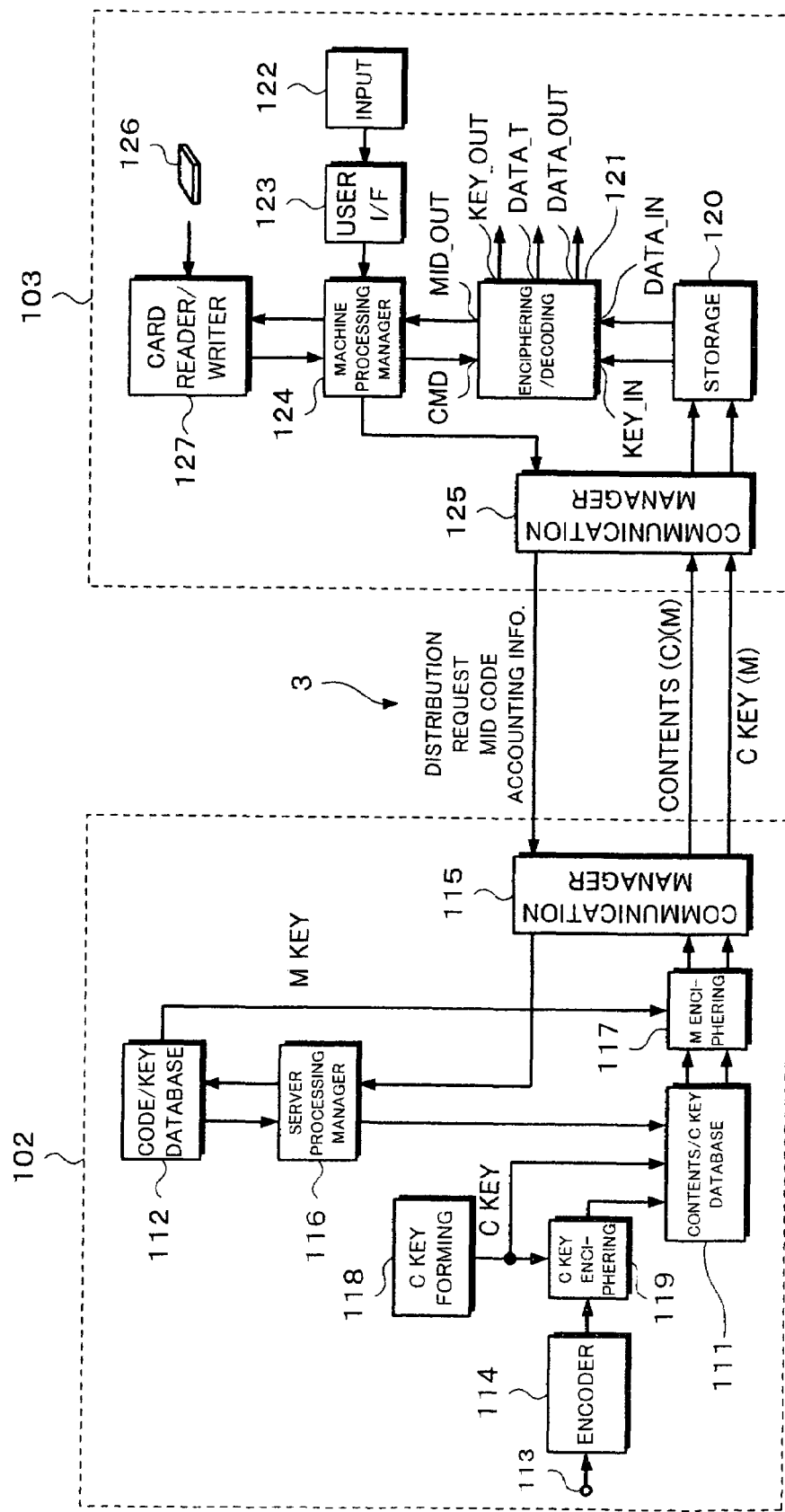
FIG. 3 is a block diagram for use in explanation of a system using a C key in the data distributing system to which the invention can be applied.

FIG. 3 shows an example of a data distributing system introducing the C key. The C key has a role to protect data every contents.

Figure 4:
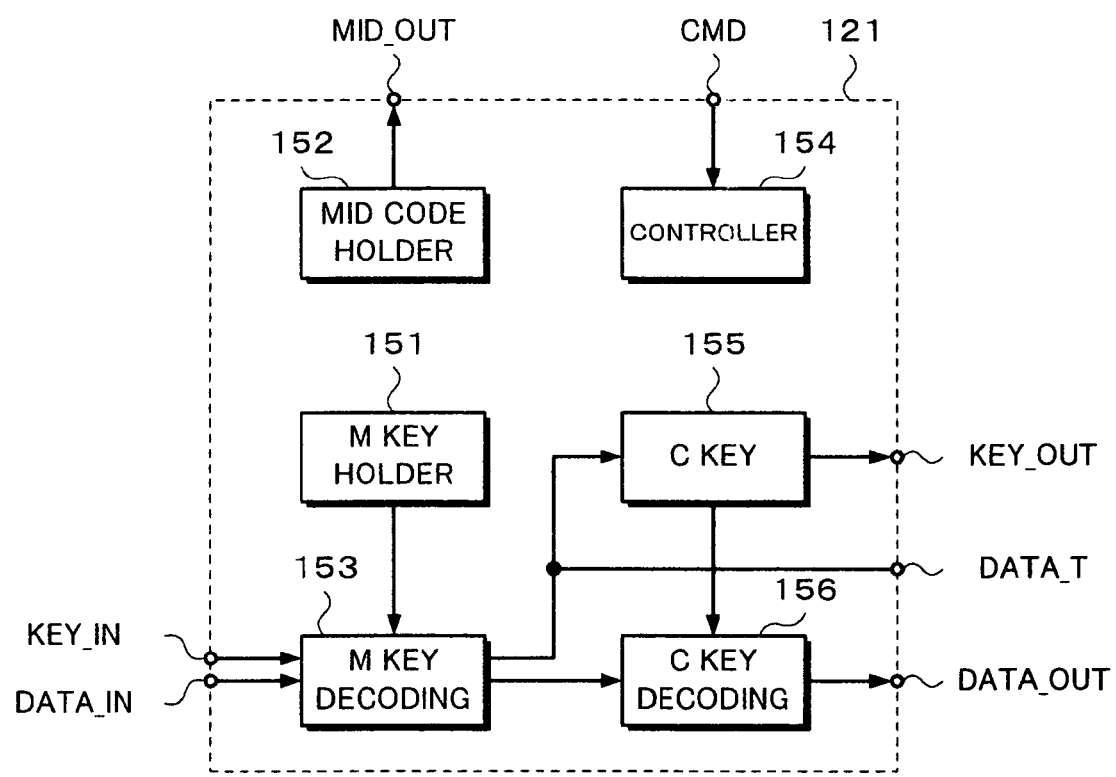
FIG. 4 is a block diagram for use in explanation of an enciphering/decoding processing unit of the system using the C key in the data distributing system to which the invention can be applied.

In the data distributing system introducing the C key, as an enciphering/decoding processing unit 121 on the side of a user machine 102, in a manner similar to the enciphering/decoding processing unit 21 shown in FIG. 2, as shown in FIG. 4, an M key holder 151, an MID code holder 152, an M key decoding circuit 153, and a controller 154 are provided. Further, a C key fetching circuit 155 and a C key decoding circuit 156 are provided for the processing unit 121. The operations of the M key holder 151, MID code holder 152, M key decoding circuit 153, and controller 154 are similar to those of the enciphering/decoding processing unit 21 in the data distributing system using only the M key mentioned above. The M key serving as enciphering information that is peculiar to the equipment of each user machine 102 is stored in the M key holder 151 at the time of shipment from the factory. The MID code serving as identification information that is peculiar to the equipment of each user machine 102 is stored in the MID code holder 152 at the time of shipment from the factory. The controller 154 controls the operation of the enciphering/decoding processing unit 121. The C key fetching circuit 155 holds the C key decoded by decoding the M key. The C key decoding circuit 156 performs the decoding process by the C key.

A command is supplied to the controller 154 from a machine processing manager, which will be explained hereinlater, through the command terminal CMD. The operation of the enciphering/decoding processing unit 121 is set on the basis of the command which is supplied from the command terminal CMD. The data which was enciphered by the C key and, further, enciphered by the M key is supplied from the input terminal DATA_IN to the M key decoding circuit 153, and the C key enciphered by the M key is also supplied thereto from an input terminal KEY_IN. The M key is supplied from the M key holder 151 to the M key decoding circuit 153.

If the enciphering key of the input data, namely, the M key which enciphered the data which is supplied from the terminal DATA_IN coincides with the M key from the M key holder 151, deciphering can be performed by the M key decoding circuit 153. The C key in which the encryption by the M key was deciphered and the data enciphered by the C key are outputted from the M key decoding circuit 153. The C key is held in the C key fetching circuit 155. The data enciphered by the C key is supplied to the C key decoding circuit 156.

In the C key decoding circuit 156, the decoding process based on the C key is performed and the data enciphered by the C key is decoded. Output data from the C key decoding circuit 156 is outputted from the data output terminal DATA_OUT. The code output terminal MID_OUT is led out from the MID code holder 152. The MID code is outputted from the code output terminal MID_OUT. To transfer the data enciphered by the C key, an output terminal KEY_OUT of the C key and an output terminal DATA_T of the data of the contents enciphered by the C key are provided for the enciphering/decoding processing unit 121.

As mentioned above, in the data distributing system introducing the C key, a processing unit with a construction as shown in FIG. 4 is used as an enciphering/decoding processing unit 121 on the user machine 102 side in FIG. 3. As shown in FIG. 3, a C key forming unit 118 to generate the C key and a C key enciphering circuit 119 for enciphering the data of the contents by using the C key formed by the C key forming unit 118 are provided on the side of a contents server 101. The other construction is similar to that of the contents server 1 shown in FIG. 1 mentioned above.

In the foregoing data distributing system of only the M key, the data from the contents input terminal 13 is compression encoded by the encoder 14 and accumulated as it is in the contents database 11. However, in the example shown in FIG. 3, the data from a contents input terminal 113 is compression encoded in an encoder 114 and, thereafter, sent to the C key enciphering circuit 119, enciphered by the C key enciphering circuit 119 by the C key from the C key forming unit 118, and accumulated into a contents database 111. The C key used in the enciphering circuit 119 in this instance is stored into the contents database 111.

When the user wants to receive the distribution of the contents of the contents server 101, the user operates an input unit 122 of the user machine 102 and inputs a contents distributing instruction to a machine processing manager 124 through a user interface 123.

When an instruction to get the contents in the contents server 101 is received from the input unit 122, the machine processing manager 124 gives a command to the enciphering/decoding processing unit 121 and inquires the MID code. When the command transmitted from the machine processing manager 124 is inputted, the enciphering/decoding processing unit 121 generates the MID code in response to the command.

When the MID code is received from the enciphering/decoding processing unit 121, the machine processing manager 124 sends the distributing request, MID code, and accounting information to a communication manager 125. Each information of the distributing request, MID code, and accounting information is sent from the communication manager 125 to a communication manager 115 of the contents server 101 through a transmission path 103.

When the MID code from the user machine 102 is supplied, the communication manager 115 sends the supplied MID code to a server processing manager 116. The server processing manager 116 sends the MID code transmitted from the user machine 102 to a code and key database 112 and transmits a command to inquire the M key corresponding to the transmitted MID code. The code and key database 112 generates the M key of the equipment corresponding to the MID code transmitted from the user machine 102. The M key outputted from the code and key database 112 is supplied to an M key enciphering circuit 117. The M key corresponding to the MID code transmitted from the user machine 102 is set into the M key enciphering circuit 117.

When the distributing request from the user machine 102 is received, the server processing manager 116 sends the command to distribute the requested contents to the contents database 111. The contents database 111 reads out the data of the contents corresponding to the distributing request of the user machine 102 on the basis of the information from the server processing manager 116.

As mentioned above, the data in the contents database 111 has been enciphered by the C key. Therefore, the contents data enciphered by the C key is further enciphered by the M key by the M key enciphering circuit 117. The C key in this instance is read out from the contents database 111 and enciphered by the M key by the M key enciphering circuit 117.

As mentioned above, the contents data which was enciphered by the C key and further enciphered by the M key and the C key enciphered by the M key are sent from the communication manager 115 of the contents server 101 to the communication manager 125 of the user machine 102 through the transmission path 103. The contents data which was transmitted from the server 101 through the transmission path 103 and enciphered by the C key and, further, enciphered by the M key and the C key enciphered by the M key are stored into a storage device 120 of the user machine 102.

As mentioned above, the contents data stored in the contents database 111 has been enciphered by the C key. When the data is transmitted from the contents server 101 to the user machine 102, the data enciphered by the C key is further enciphered by the M key. Although the C key is necessary to decode the data of the contents enciphered by the C key, the C key is enciphered by the M key and supplied from the contents server 101 to the user machine 102.

In case of decoding the data of the contents stored in the storage device 120, the data of the contents read out from the storage device 120 is supplied to a data input terminal DATA_IN of the enciphering/decoding processing unit 121 in FIG. 4. The C key enciphered by the M key is read out from the storage device 120 and supplied to the key input terminal KEY_IN of the enciphering/decoding processing unit 121.

As shown in FIG. 4, the M key peculiar to the equipment of the user machine 102 has been stored in the M key holder 151 of the enciphering/decoding processing unit 121. The data of the contents sent from the contents server 101 has been enciphered by the M key corresponding to the MID code in the MID code holder 152. The M key set in the M key enciphering circuit 117 on the contents server 101 side is the same as that stored in the M key holder 151. Therefore, in the contents data which was enciphered by the C key and, further, enciphered by the M key and is supplied from the storage device 120, the enciphered portion based on the M key can be decoded by the M key decoding circuit 153.

Similarly, the C key which was enciphered by the M key and is supplied from the storage device 120 is decoded by the M key decoding circuit 153.

Therefore, the data enciphered by the C key and the C key are outputted from the M key decoding circuit 153. The C key is supplied to the C key fetching circuit 155. The data enciphered by the C key is supplied to the C key decoding circuit 156. The encryption by the C key is deciphered by the C key decoding circuit 156 and the data of the contents is decoded. The decoded data is outputted from the data output terminal DATA_OUT. The C key which is outputted from the C key fetching circuit 155 is outputted from the key output terminal KEY_OUT.

By enciphering the contents data by the C key as mentioned above, when the contents data is used, the C key to decode it is certainly necessary. Since the data of the contents can be used only by the user machine or equipment on the user side having the C key, the C key can be used as a key showing the right such that the data of the contents can be used.

That is, if the C key is sent from a certain user machine as one terminal equipment to the other user machine as another terminal equipment, this means that the data of the contents and the right to use the data of the contents are sent. The contents data can be used by the terminal equipment on the other user side. After the C key was sent from one terminal equipment to the terminal equipment on the other user side as mentioned above, if the C key of the equipment is erased, even if the data of the contents remains in the equipment on the sending side, the encryption by the C key added to the contents data cannot be deciphered, so that the contents data cannot be used at all. In other words, it can be regarded that the contents data was transferred to the equipment on the other user side or the other user.

There is a case where the legal user erroneously erases the contents data or fails in download of the contents data. Even in this case, if the C key remains in the user machine 102, by allowing the contents data to be retransmitted from the server 101 and decoding the retransmitted contents data by using the remaining C key, the contents data can be used. By introducing the C key as mentioned above, the contents data can be moved or retransmitted as follows. The charging can be set by using the C key.

The C key from the key output terminal KEY OUT of the enciphering/decoding processing unit 121 and the data enciphered by the C key from the output terminal DATA_T of the data are transferred to the user machine as equipment on the partner side serving as a movement destination. When the data transfer is finished, the C key stored in the C key fetching circuit 155 and the C key stored in the storage device 120 are erased, so that the contents data is moved. With this method, the contents data can be used only by the equipment on the partner side. At this time, it is not always necessary to erase the contents data remaining in the storage device 120 of the user machine serving as a moving source side. This is because the contents data remaining in the storage device 120 of the user machine serving as a moving source has been enciphered by the C key and, if the C key is erased, the contents data cannot be decoded, so that it cannot be used as contents data.

On the contrary to the above case, even after the data of the contents in the storage device 120 was erased, if the C key is stored, by allowing the contents data to be retransmitted from the server 101, the contents data can be again used. The retransmission of the contents data is performed by processes similar to those in the case of downloading the contents data mentioned above. At this time, whether the new contents data is distributed, namely, downloaded or not is discriminated by the C key and the charging is performed only in case of the new data. For example, the user machine 102 collates the transmitted C key by the contents database 111, thereby discriminating about the distribution of the new contents data by checking at which time the C key was formed by the C key forming unit 118.

By using the C key, the charging according to the contents of the distribution of the contents data can be performed as mentioned above. For example, the C key can be added only to the toll contents data without adding the C key to the toll-free contents data. On the receiving side, namely, the user machine 102 side, the machine processing manager 124 discriminates whether the C key sent from the server 101 is a new key or not. The charging is performed only when it is the new C key. By this method, whether the contents or the data of the contents to be taken out of the server 101 is the toll contents or the toll data of the contents or not can be discriminated on the basis of the C key which is transmitted from the server 101, so that the toll contents or the toll data of the contents can be protected. In case of the retransmission of the data of the contents mentioned above, the C key stored in the user machine 102 and the C key which enciphered the received contents data are compared. From the result of this comparison, whether the charging is performed or not can be discriminated as mentioned above. Further, it is also possible to form a code from information (for example, ranking of the contents or the like) regarding the charging, include the formed code into the C key, and change the fee for the same contents in accordance with the conditions.

Figure 5:
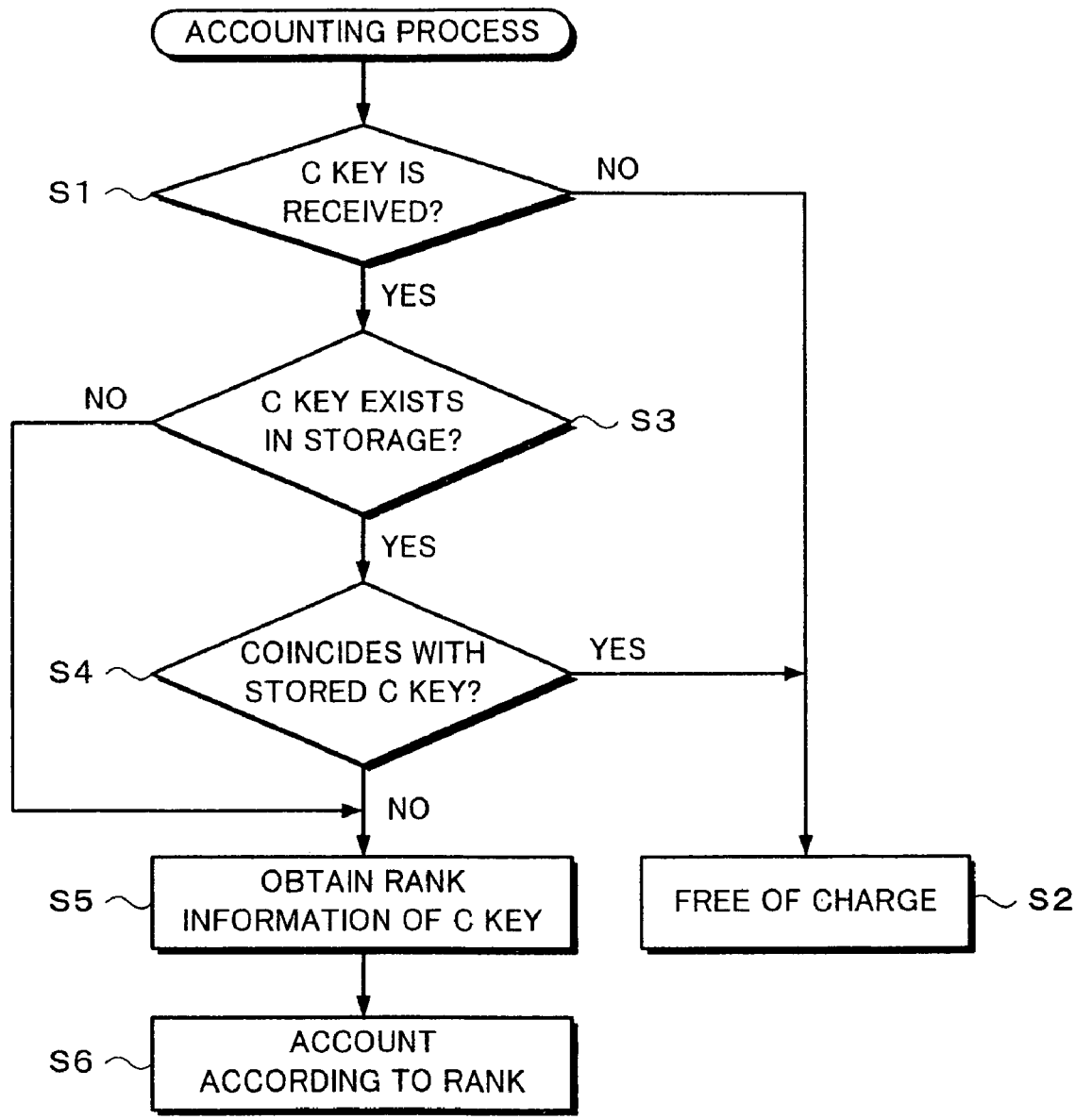
FIG. 5 is a flowchart for use in explanation of the system using the C key in the data distributing system to which the invention can be applied.

FIG. 5 is a flowchart showing an accounting process using the C key. A check is made to see if it has been outputted from the key output terminal KEY_OUT of the enciphering/decoding processing unit 121 of the user machine 102, that is, the C key has been received when the data distributed from the server 101 is fetched into the storage device 120 of the user machine 102, namely, at the time of downloading (step S1). If the C key is not received, the data of the contents distributed from the server 101 is determined to be the toll-free contents data, and the charging is not performed (step S2). If the C key is received, whether the C key has been stored in the storage device 120 or not is discriminated (step S3). In case of the retransmission of the contents, since the C key has been stored in the storage device 120, whether the received C key and the C key stored in the storage device 120 coincide or not is discriminated (step S4). When the received C key and the C key stored in the storage device 120 coincide, since this means the retransmission of the data of the contents, the charging is not performed (step S2).

When it is decided in step S3 that the C key transmitted from the server 101 is not stored in the storage device 120 or when it is determined in step S4 that the received C key and the C key stored in the storage device 120 do not coincide, information of the charging rank of the C key is obtained (step S5). The accounting process is performed in accordance with the information of the charging rank (step S6). As charging ranking information of the C key, for example, information showing the kind of data of the contents, quality of the data, or the like is considered.

4. System Using the T Key

As mentioned above, by introducing the C key into the data distributing system, the movement of the data of the contents between the user machine as certain equipment and the user machine as another equipment and the retransmission of the contents data can be performed. However, if only the C key is used, the C key is directly transmitted when the contents is moved to the equipment on the partner side serving as a movement destination. At this time, there is a possibility that the C key leaks to the outside and the data of the contents cannot be protected. An example in which the T key is introduced into the data distributing system in order to protect the data of the contents at the time of data movement will now be described hereinbelow.

Figure 6:
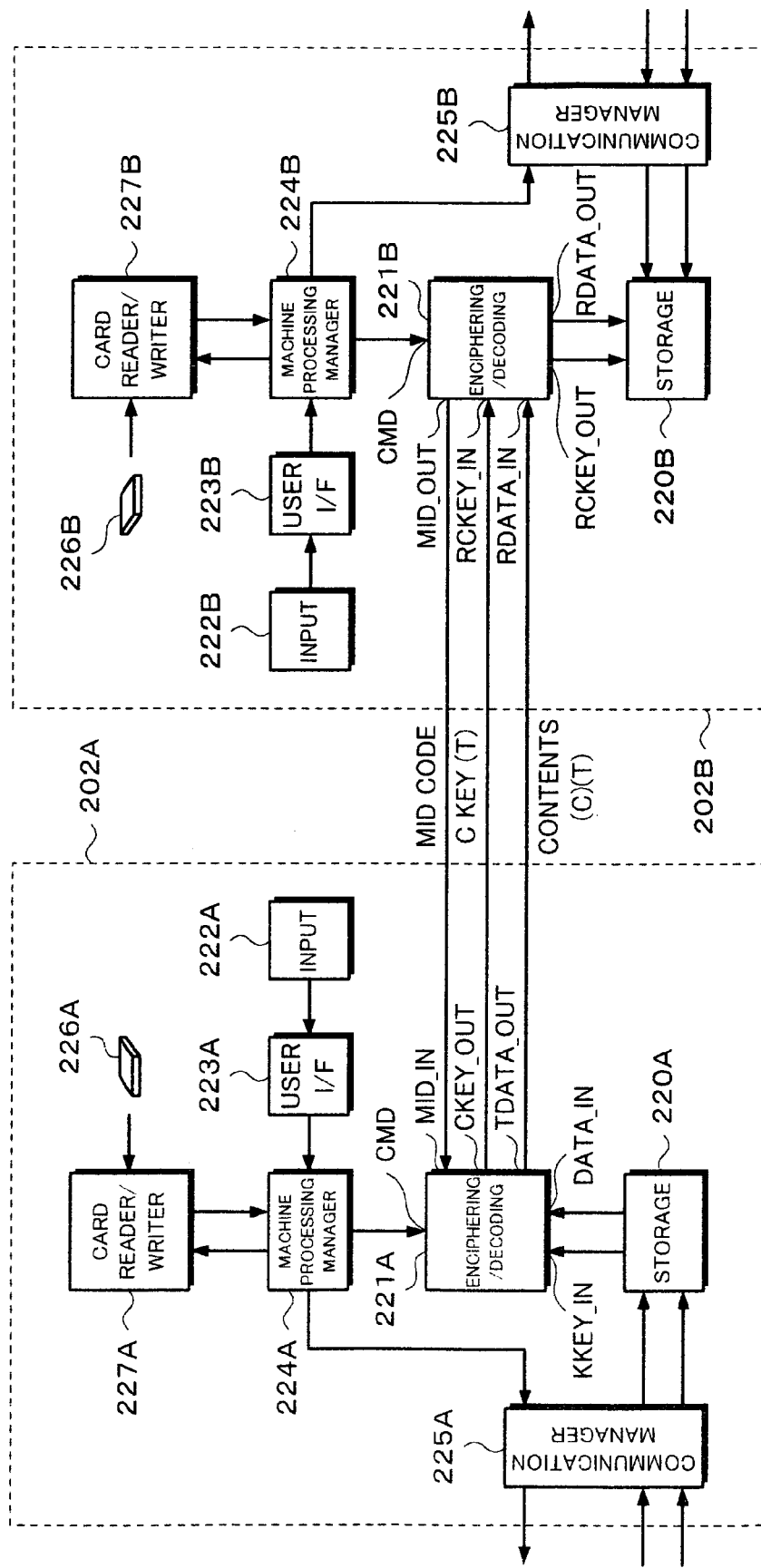
FIG. 6 is a block diagram for use in explanation of a system using a T key in a data distributing system to which the invention can be applied.

FIG. 6 shows an example of the data distributing system introducing the T key. In FIG. 6, a user machine 202A on the sending side of the data is constructed by a storage device 220A, an enciphering/decoding processing unit 221A, an input unit 222A, a user interface 223A, a machine processing manager 224A, a communication manager 225A, and a card reader/writer 227A in a manner similar to the user machine 102 of the data distributing system shown in FIG. 3 mentioned above. A card 226A similar to a card 126 which is used in the data distributing system shown in FIG. 3 mentioned above is loaded into the card reader/writer 227A.

Like a user machine 202A mentioned above, a user machine 202B on the receiving side of the data is constructed by a storage device 220B, an enciphering/decoding processing unit 221B, an input unit 222B, a user interface 223B, a machine processing manager 224B, a communication manager 225B, and a card reader/writer 227B in a manner similar to the user machine 102 of the data distributing system shown in FIG. 3 mentioned above. A card 226B similar to the foregoing card 226A is loaded into the card reader/writer 227B.

Figure 7:
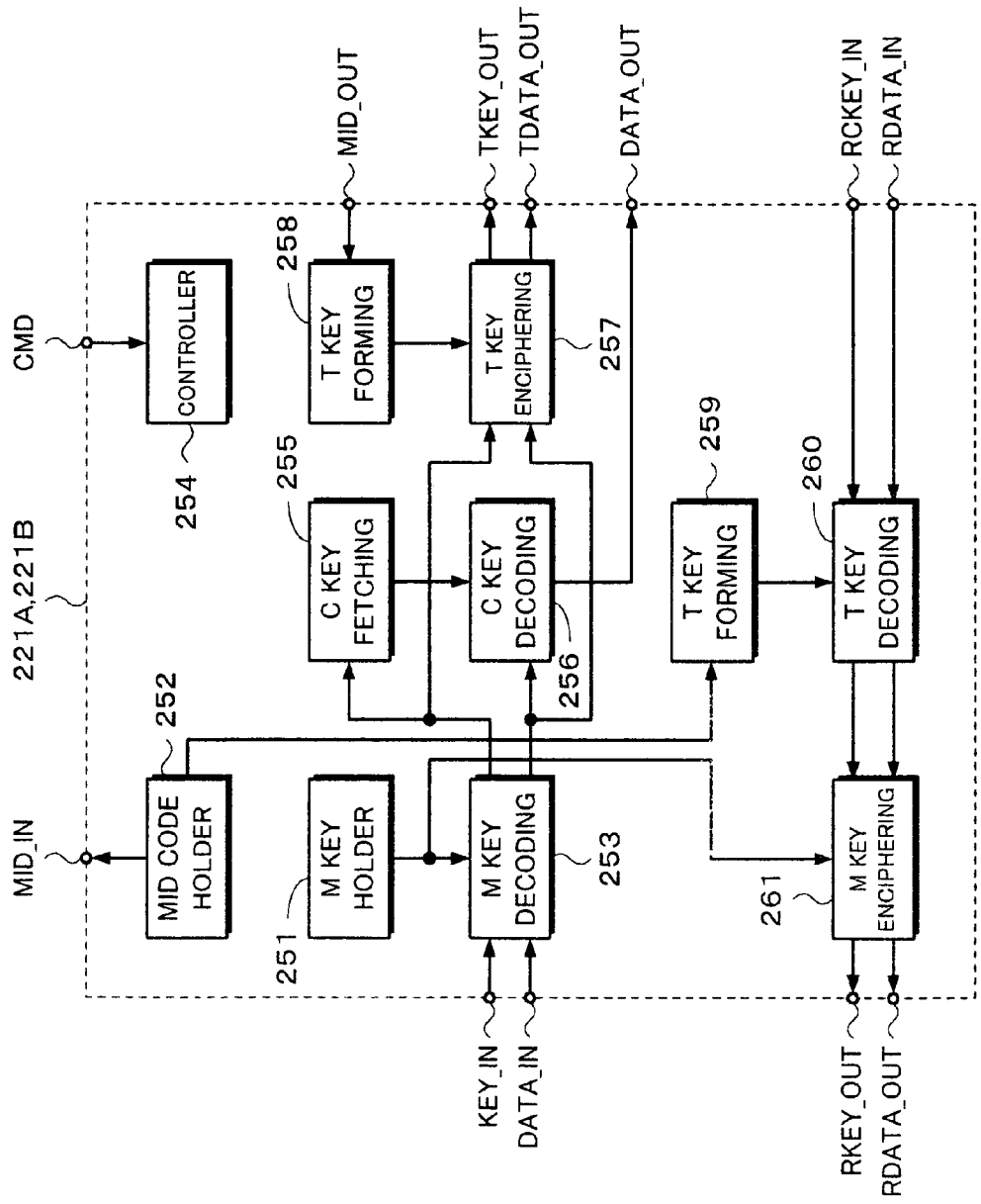
FIG. 7 is a block diagram for use in explanation of an enciphering/decoding processing unit of the system using the T key in the data distributing system to which the invention can be applied.

In the data transfer system introducing the T key, processing units as shown in FIG. 7 are used as enciphering/decoding processing units 221A and 221B. As shown in FIG. 7, an M key holder 251, an MID code holder 252, an M key decoding circuit 253, a controller 254, a C key fetching circuit 255, and a C key decoding circuit 256 are provided in each of the enciphering/decoding processing units 221A and 221B. A T key enciphering circuit 257, T key forming circuits 258 and 259, a T key decoding circuit 260, and an M key enciphering circuit 261 are also provided.

The operations of the M key holder 251, MID code holder 252, M key decoding circuit 253, and controller 254 are similar to those of the enciphering/decoding processing units 21 and 121 of the user machines 2 and 102 in the foregoing data distributing system. The M key as enciphering information that is peculiar to the equipment of each user machine is stored in the M key holder 251 at the time of shipment from the factory. The MID code as identification information that is peculiar to each equipment is stored in the MID code holder 252 at the time of shipment from the factory. The controller 254 controls the operations of the enciphering/decoding processing units 221A and 221B. The C key fetching circuit 255 holds the C key decoded by the decryption of the M key. The C key decoding circuit 256 performs the decoding process of the C key.

The T key enciphering circuit 257 enciphers the data which is moved from the user machine 202A serving as certain equipment to the other user machine 202B serving as another equipment by the T key from the T key forming circuit 258. The T key decoding circuit 260 decodes the moved data by the T key from the T key forming circuit 259. Each of the T key forming circuits 258 and 259 forms the T key on the basis of the MID code.

Figures 8, 8A:
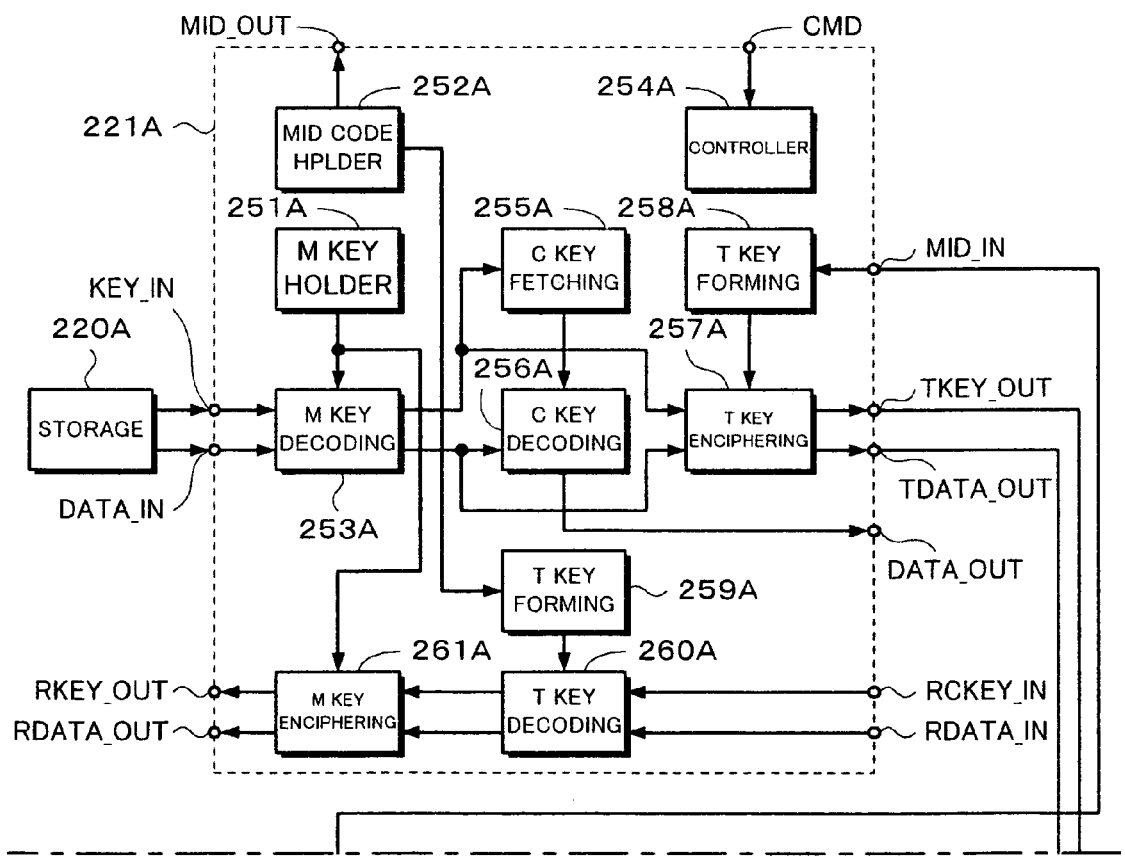
FIGS. 8A and 8B are block diagrams for use in explanation of the enciphering/decoding processing unit in the system using the T key in the data distributing system to which the invention can be applied.
Figure 8B:
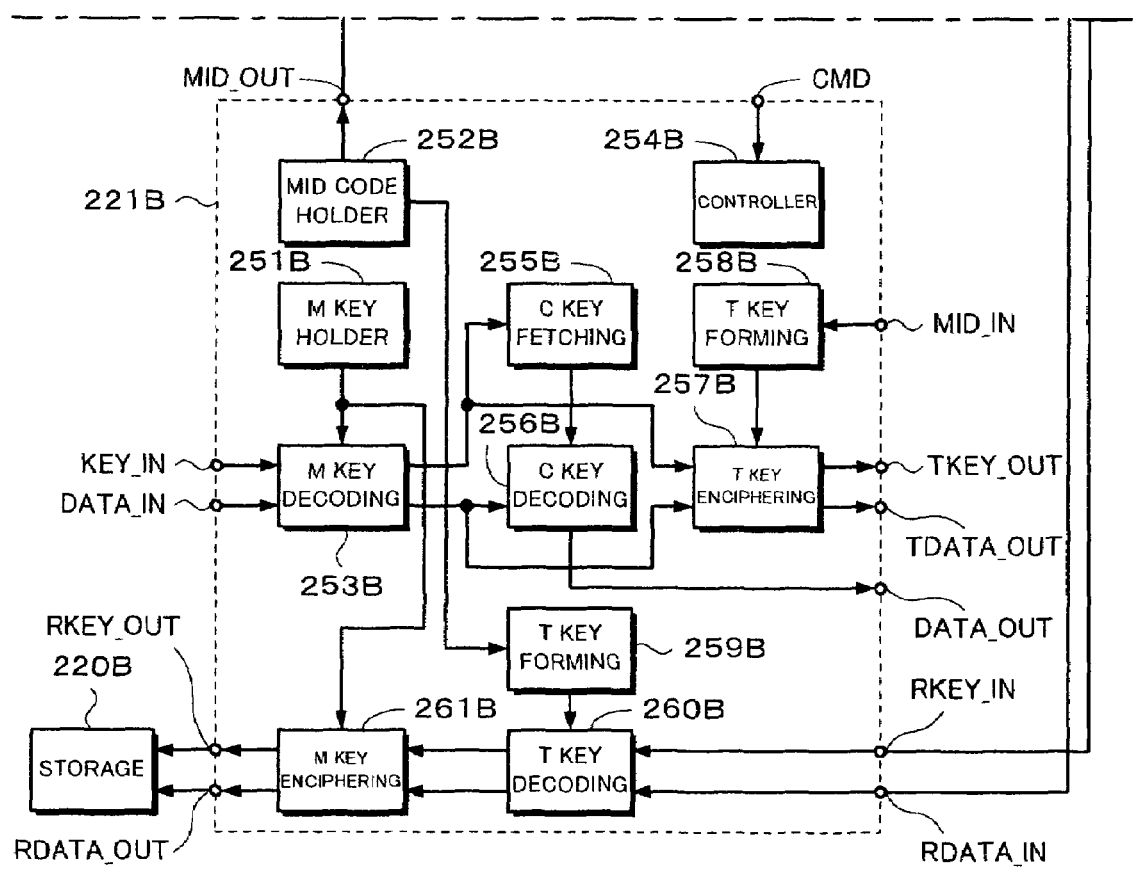

FIGS. 8A and 8B are diagrams for explaining the operations of the enciphering/decoding processing units 221A and 221B when the data of the contents is moved from the user machine 202A to the user machine 202B.

When the data of the contents is moved from the user machine 202A to the user machine 202B, a transferring request of the MID code is sent from the user machine 202A on the sending side of the data to the user machine 202B on the partner side.

In the user machine 202B on the partner side, when a transmitting request of the MID code is received, the MID code is called from an MID code holder 252B of the enciphering/decoding processing unit 221B of the user machine 202B, the MID code read out from the MID code holder 252B is outputted from the code output terminal MID_OUT, and the MID code is transmitted from the user machine 202B to the user machine 202A.

In the user machine 202A on the data sending side, when the MID code transmitted from the user machine 202B on the partner side is received from a code input terminal MID_IN, the received MID code is supplied to a T key forming circuit 258A. The T key forming circuit 258A forms the T key on the basis of the MID code sent from the user machine 202B on the partner side. The T key formed by the T key forming circuit 258A is supplied to a T key enciphering circuit 257A.

The user machine 202A receives the MID code from the user machine 202B. When the T key is formed on the basis of the MID code received in the T key forming circuit 258A and supplied to the T key enciphering circuit 257A, the operation to transmit the contents data and the C key from the user machine 202A to the user machine 202B is started.

The contents data which was enciphered by the C key and, further, enciphered by the M key and the C key enciphered by the M key have been stored in the storage device 220A of the user machine 202A. Therefore, when the contents data and the C key are transmitted from the user machine 202A to the user machine 202B, the contents data which was enciphered by the C key and, further, enciphered by the M key and the C key enciphered by the M key are supplied from the storage device 220A of the user machine 202A to the key input terminal KEY_IN and data input terminal DATA_IN of the enciphering/decoding processing unit 221A.

The M key is supplied from an M key holder 251A to an M key decoding circuit 253A. In the M key decoding circuit 253A, the decoding process of the encryption performed on the basis of the M key is executed by the M key from the M key holder 251A. The decoded C key and the contents data enciphered by the C key are outputted from the M key decoding circuit 253A. The C key which is outputted from the decoding circuit 253A is supplied to a C key fetching circuit 255A and supplied to the T key enciphering circuit 257A. The contents data enciphered by the C key which is outputted from the decoding circuit 253A is supplied to a C key decoding circuit 256A and supplied to the T key enciphering circuit 257A.

In the C key decoding circuit 256A, a decoding process of the data of the contents enciphered by the C key which is supplied from the decoding circuit 253A is performed and a decoding process of the encryption based on the C key performed to the data of the contents is performed. The decoded contents data is outputted from the data output terminal DATA_OUT.

The T key formed in the T key forming circuit 258A on the basis of the MID code of the user machine 202B is set into the T key enciphering circuit 257A. The C key and the contents data enciphered by the C key which are outputted from the M key decoding circuit 253A are enciphered by the T key formed on the basis of the MID code of the user machine 202B on the partner side by the T key enciphering circuit 257A. Therefore, the C key enciphered by the T key and the contents data which was enciphered by the C key and, further, enciphered by the T key are outputted from the T key enciphering circuit 257A.

The C key enciphered by the T key and the contents data which was enciphered by the C key and, further, enciphered by the T key are outputted from a key output terminal TKEY_OUT and a data output terminal TDATA_OUT, sent to the user machine 202B on the partner side, inputted to a key input terminal RCKEY_IN and a data input terminal RDATA_IN of the enciphering/decoding processing unit 221B of the user machine 202B on the partner side, and supplied to a T key decoding circuit 260B. At a point when the transmission of the C key enciphered by the T key and the contents data enciphered by the C key and the T key to the user machine 202B is completed, the C key stored in the storage device 220A of the user machine 202A is deleted and the reading of the contents data from the storage device is inhibited.

The T key is supplied from a T key forming circuit 259B to the T key decoding circuit 260B. The T key is formed in the T key forming circuit 259B on the basis of the MID code from the MID code holder 252B.

In the user machine 202A on the sending side, the MID code which is transmitted from the user machine 202B is received and the T key is formed in the T key forming circuit 258A on the basis of the received MID code. In the T key decoding circuit 260B of the user machine 202B on the receiving side, the T key is formed on the basis of the MID code from the MID code holder 252B. The same MID code is sent to the T key forming circuits 258A and 259B. Therefore, the contents data and C key which had been enciphered by the T key and sent from the user machine 202A can be decoded by the T key decoding circuit 260B of the user machine 202B.

The C key and the data of the contents enciphered by the C key are outputted from the T key decoding circuit 260B. The C key and the data of the contents enciphered by the C key are supplied to an M key enciphering circuit 261B.

The M key peculiar to the equipment of the user machine 202B is sent from an M key holder 251B to the M key enciphering circuit 261B. The C key and the data of the contents enciphered by the C key are enciphered on the basis of the M key read out from the M key holder 251B. Therefore, the C key enciphered by the M key and the data of the contents which was enciphered by the C key and, further, enciphered by the M key are outputted from the M key enciphering circuit 261B. The C key enciphered by the M key and the data of the contents which was enciphered by the C key and, further, enciphered by the M key which are outputted from the M key enciphering circuit 261B are outputted from a key output terminal RKEY_OUT and a data output terminal RDATA_OUT, respectively, and stored into the storage device 220B of the user machine 202B.

As mentioned above, by using the T key, when the data is moved from the user machine 202A to the user machine 202B, the C key and the contents data enciphered by the C key which are transmitted from the user machine 202A to the user machine 202B are further enciphered by the T key. Therefore, the C key as an enciphering key does not leak to the outside and the data of the contents can be protected.

5. System Using a DA Code

As mentioned above, by introducing the T key to the data distributing system, when the data is moved between the user machine serving as certain equipment and the user machine serving as another equipment, the data can be protected. However, as mentioned above, even if the T key is introduced, the data can be moved in the same equipment. For example, after the C key was temporarily stored in another location in the same user machine, for example, in another storing unit, if the data of the contents is moved and, thereafter, the C key is returned to the original location, although the C key is erased due to the movement of the contents data, since the C key has separately been stored in another location, the contents data is illegally copied by using the stored C key.

Therefore, a method whereby a code (called a DA code) which dynamically changes with the elapse of time is added to the C key and an element which changes with respect to time is provided for the C key is considered. A data distributing system using the C key having the element which changes with respect to time will now be described hereinbelow with reference to FIG. 9 and subsequent drawings.

Figure 9:
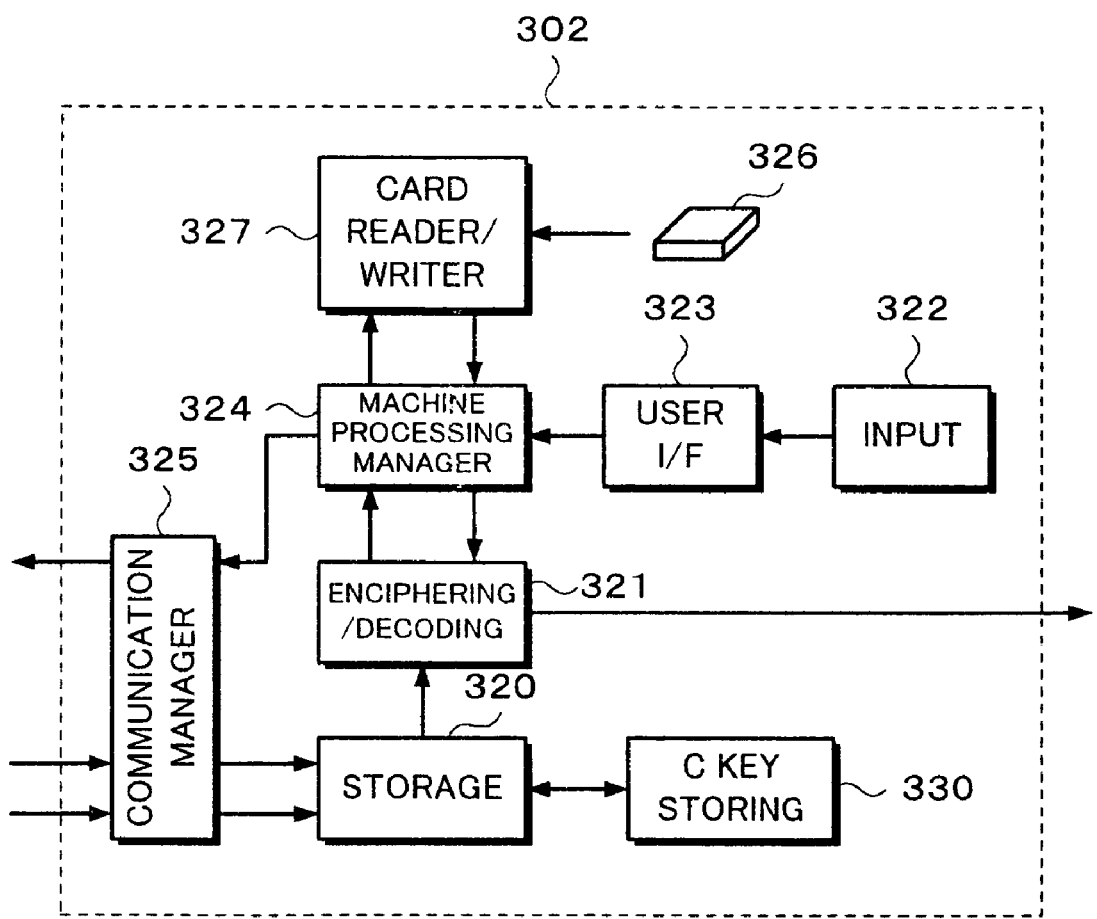
FIG. 9 is a block diagram for use in explanation of a system using a DA code in a data distributing system to which the invention can be applied.

That is, in FIG. 9, in a manner similar to the foregoing user machine 102 shown in FIG. 3 except for a C key storing memory 330, a user machine 302 is constructed by: a storage device 320; an enciphering/decoding processing unit 321; an input unit 322; a user interface 323; a machine processing manager 324; a communication manager 325; and a card reader/writer 327. A card 326 similar to the card 126 shown in FIG. 3 mentioned above is loaded into the card reader/writer 327.

In such a user machine 302, for example, it is now assumed that the C key is read out from the storage device 320, the C key read out from the storage device 320 is stored into the C key storing memory 330, and thereafter, data of contents in the storage device 320 is moved to another user machine serving as another equipment. In this case, when the movement of the contents data is finished, although the C key in the storage device 320 is erased, since the C key has been shunted to the C key storing memory 330, the C key in the memory 330 is not erased. After that, by returning the C key from the C key storing memory 330 to the storage device 320, if the data of the contents remains in the storage device 320, the contents data which ought to have been moved to the other user machine can be decoded. Further, even if no contents data exists in the storage device 320, when there is the C key, the retransmission of the contents data can be requested from the contents server 1 as mentioned above. The contents data can be illegally used.

Figure 10:
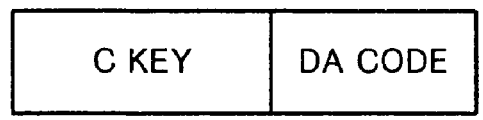
FIG. 10 is a schematic diagram for use in explanation of the DA code.

In the present data distributing system, therefore, as shown in FIG. 10, a DA code which dynamically changes with the elapse of time is added to the C key. A time code or random numbers are used as a DA code. By adding the DA code to the C key as mentioned above, the illegal use of the contents data as mentioned above can be prevented.

Figure 11:
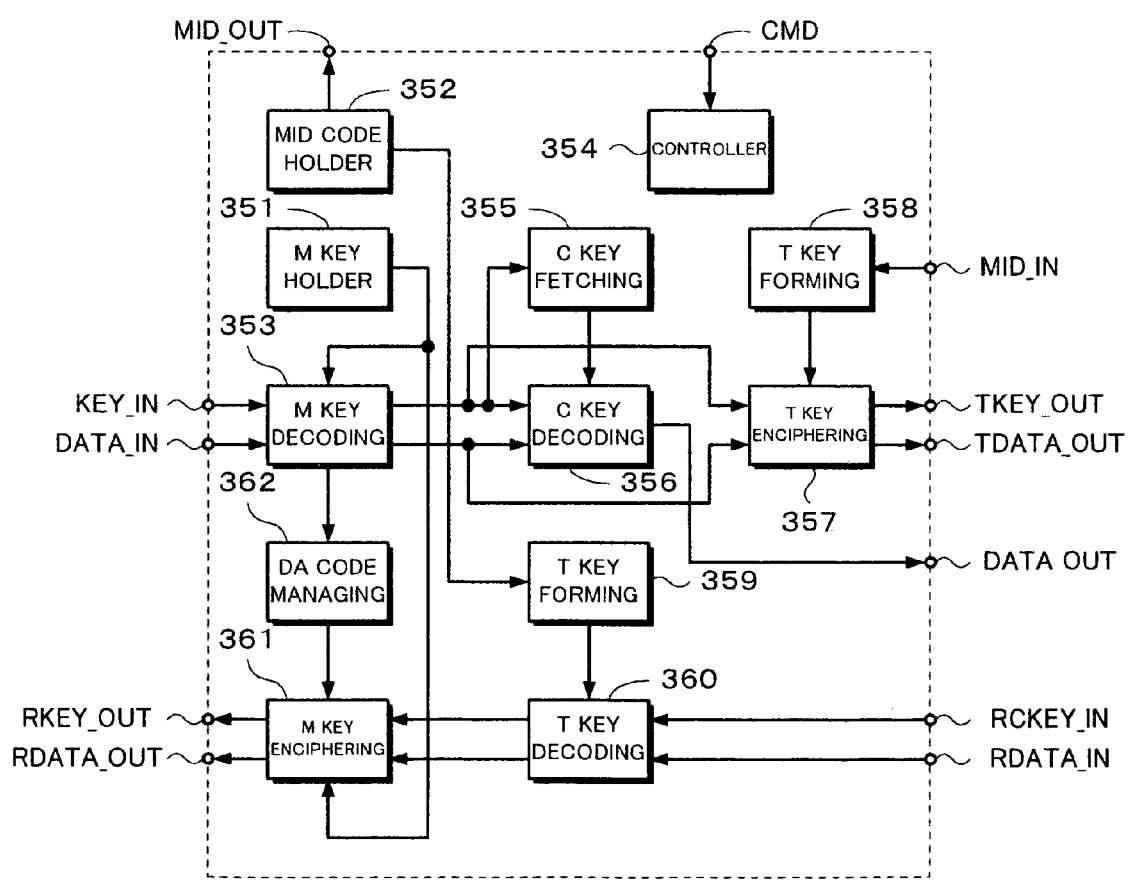
FIG. 11 is a block diagram for use in explanation of an enciphering/decoding processing unit of the system using the DA code in the data distributing system to which the invention can be applied.

FIG. 11 shows a construction of the enciphering/decoding processing unit 321 to handle the C key to which the DA code shown in FIG. 10 was added. In a manner similar to the enciphering/decoding processing units 221A and 221B shown in FIG. 7, the enciphering/decoding processing unit 321 has: an M key holder 351; an MID code holder 352; an M key decoding circuit 353; a controller 354; a C key fetching circuit 355; a C key decoding circuit 356; a T key enciphering circuit 357; T key forming circuits 358 and 359; a T key decoding circuit 360; and an M key enciphering circuit 361. A DA code managing circuit 362 is also provided.

The DA code managing circuit 362 manages the DA code which is added to the C key. That is, the DA code managing circuit 362 calls the C key from the storage device 320 every predetermined time. When the C key is called, the DA code of the C key is checked. If the DA code is correct, an updating process of the DA code is performed.

The C key enciphered by the M key has been stored in the storage device 320. Therefore, the C key enciphered by the M key is first sent from the key input terminal KEY_IN to the M key decoding circuit 353 and a decoding process of the encryption performed on the basis of the M key is performed. The decoded C key is outputted from the M key decoding circuit 353. This C key is sent to the DA code managing circuit 362.

The DA code managing circuit 362 detects the DA code of the C key which is supplied from the decoding circuit 353 every predetermined time and discriminates whether the DA code which was correctly updated has been added to the C key or not. If the DA code added to the C key is a DA code which was correctly updated, the updating of the DA code is performed. The C key in which the DA code was updated is supplied to the M key enciphering circuit 361, the enciphering process is again performed on the basis of the M key, and the enciphered C key is again stored into the storage device 320. In case of a time code of the DA code added to the C key, it is also possible to perform the updating of the DA code by discriminating whether the time code has changed in accordance with a predetermined rule or not. It is also possible to discriminate it on the basis of a method which is used in step S13, which will be explained hereinlater.

Figure 12:
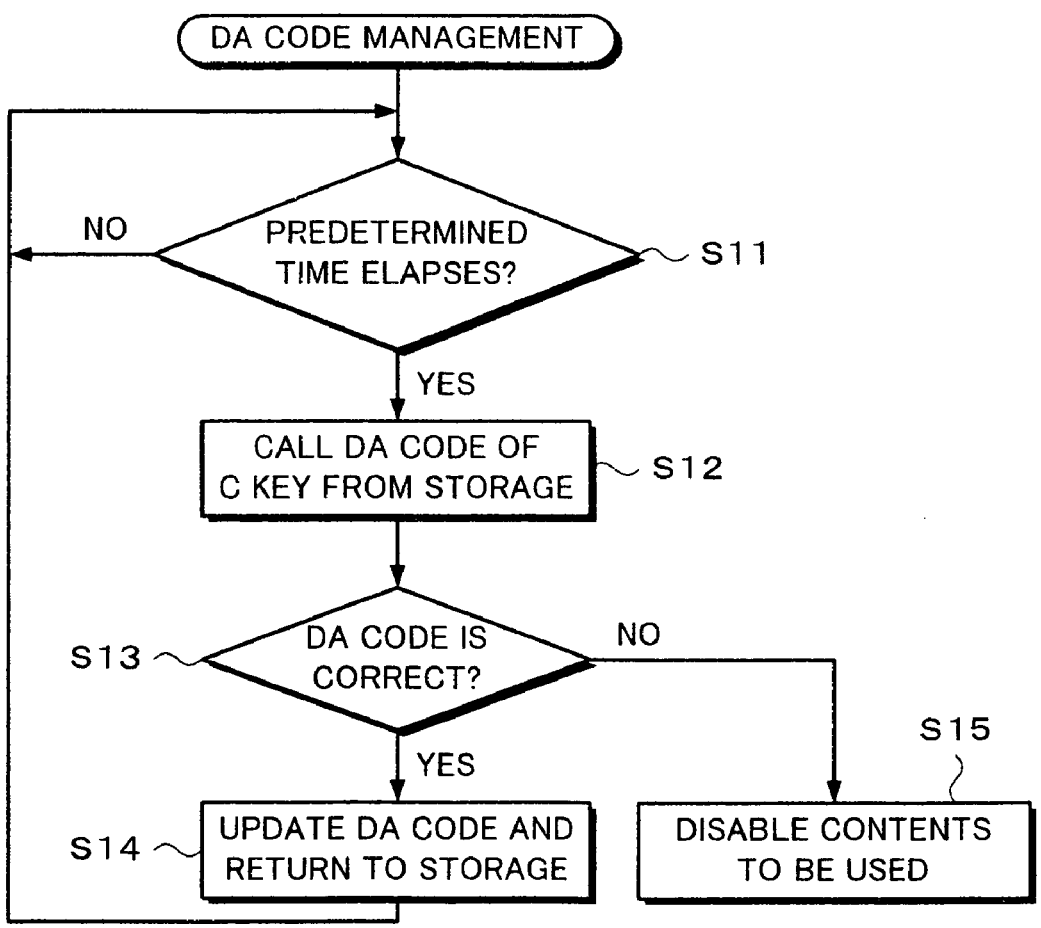
FIG. 12 is a flowchart for use in explanation of the system using the DA code in the data distributing system to which the invention can be applied.

FIG. 12 is a flowchart showing processes of the DA code managing circuit 362. In FIG. 12, whether a predetermined time has elapsed or not is discriminated by, for example, a timer function of the controller 354 or DA code managing circuit 362 (step S11). When the predetermined time elapses, the C key is read out from the storage device 320 and decoded by the decoding circuit 353 and the DA code added to the decoded C key is detected (step S12). Whether the DA code read out from the storage device 320 is the DA code which was correctly updated or not is discriminated (step S13). The discrimination about whether the DA code has correctly been updated or not in step S13 can be made by checking whether the DA code held in the enciphering/decoding processing unit 321 and the DA code read out from the storage device 320 coincide or not. If it is determined in step S13 that the DA code is the DA code which was correctly updated, this DA code is updated to the next DA code. The C key to which the updated DA code has been added is again subjected to an enciphering process on the basis of the M key by the M key enciphering circuit 361 and returned to the storage device 320 (step S14).

If it is determined in step S13 that the detected DA code is not the DA code which was correctly updated, the C key in the storage device 320 is erased or a code indicative of the illegal use is added to the C key and the use of the data of the contents corresponding to the C key which was determined that the DA code is not correctly updated is inhibited (step S15).

As mentioned above, when the C key in the storage device 320 is normally handled, the DA code which is added to the C key is always updated every predetermined time by the DA code managing circuit 362, and the C key to which the updated DA code was added is stored into the storage device 320.

For example, in the case where the C key was stored in the C key storing memory 330 in FIG. 9, since the DA code of the C key stored in the C key storing memory 330 is not updated as mentioned above, it is determined in the DA code managing circuit 362 that the DA code is not correct. Thus, it is possible to prevent a situation such that the C key is once stored in the memory 330 and the data of the contents is moved and the data of the contents is illegally used by using the C code stored in the memory 330 after the movement as mentioned above.

As mentioned above, by using the DA code which dynamically changes, the reproduction can be inhibited or permitted for a certain period of time. If it is used, the contents can be lent for a predetermined period of time or a trial period can be set in the use of the contents.

Figure 13:
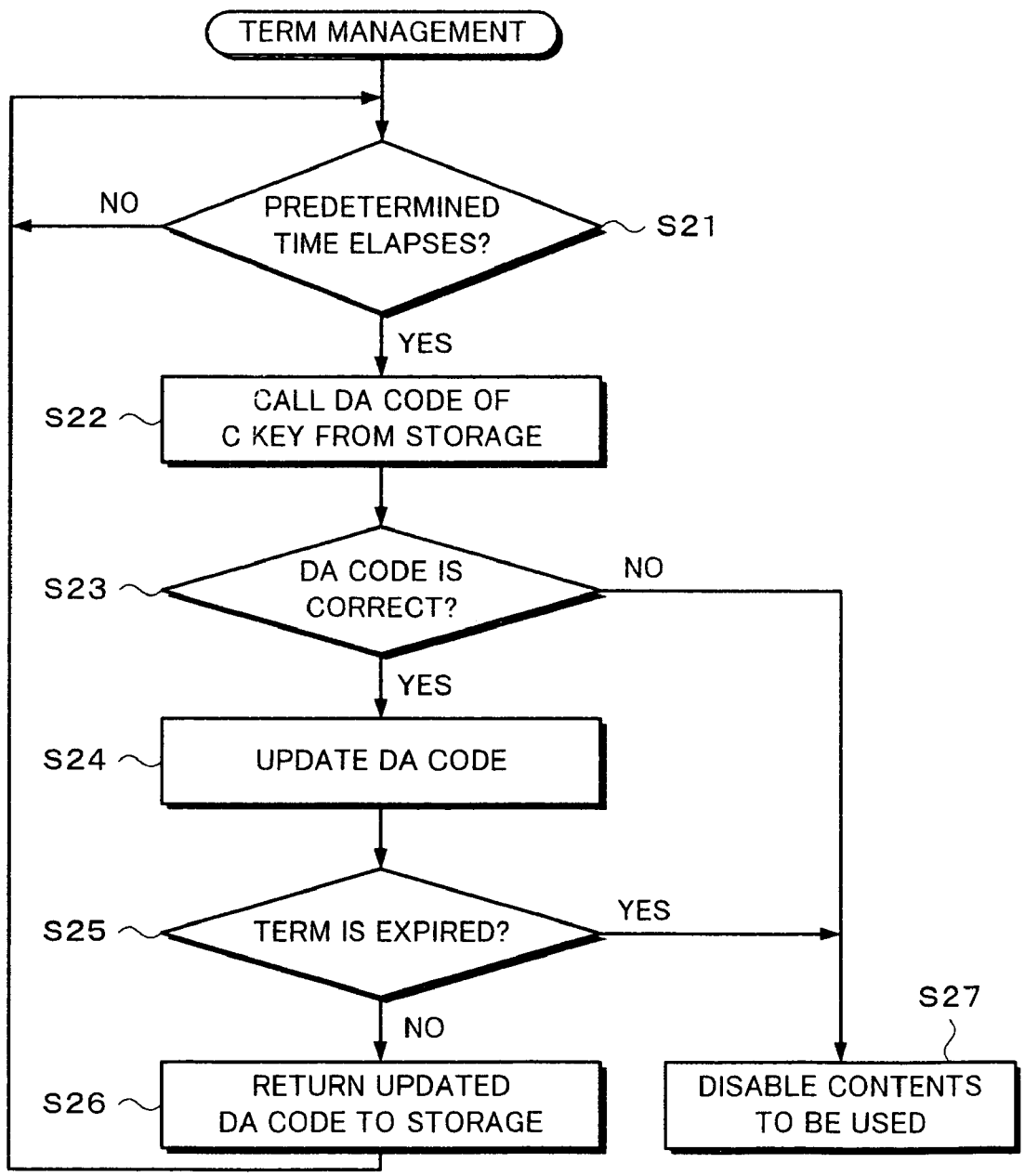
FIG. 13 is a flowchart for use in explanation of the system using the DA code in the data distributing system to which the invention can be applied.
Figure 14:
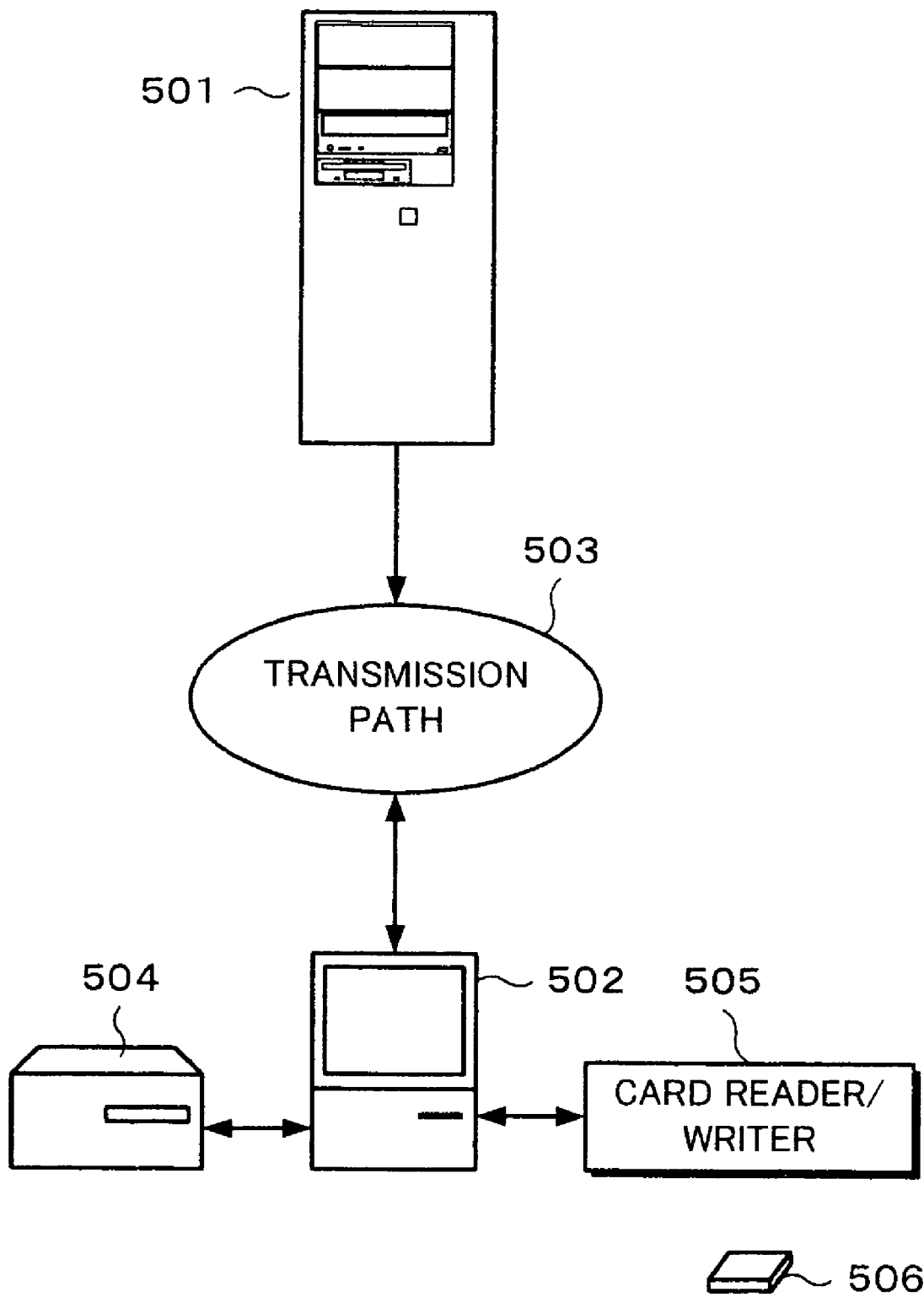
FIG. 14 is a block diagram of an example of a conventional data distributing system.

FIG. 13 is a flowchart showing processes in case of setting such that data of contents can be reproduced only for a predetermined period of time by using the C key having the DA code which dynamically changes as mentioned above. In the case shown in FIG. 13, a time code is used as a DA code. Term information is further added to the DA code of the C key.

In FIG. 13, whether a predetermined time has elapsed or not is discriminated (step S21) in a manner similar to step S11 mentioned above. When the predetermined time elapses, the C key stored in the storage device 320 is called. The DA code added to the C key is detected (step S22) in a manner similar to step S12 mentioned above. Whether the DA code has correctly been updated or not is discriminated (step S23). If it is determined in step S23 that the DA code has correctly been updated, this DA code is updated to the next DA code by the DA code managing circuit 362 (step S24). The term information added to the updated DA code is compared with the term information showing a use term of the contents data and held in a DA code management code, thereby discriminating whether the term of the C key has expired the use term or not (step S25). If the term of the C key does not expire the use term, the C key to which this updated DA code was added is returned to the storage device 320 (step S26). The processing routine is returned to step S21.

If it is decided in step S23 that the DA code called from the storage device 320 is not the DA code which was correctly updated, the C key is deleted from the storage device 320 or a code indicative of the illegal use is added to the C key, thereby disabling the use of the data of the contents corresponding to the C key which was decided that the DA code is not correctly updated (step S26). When it is determined in step S25 that the term of the C key has expired the use term, step S26 follows. The C key is deleted from the storage device 320 or a code indicative of the illegal use is added to the C key, thereby disabling the use of the data of the contents corresponding to the C key which was decided that the term has expired the use term in a manner similar to the above.

As mentioned above, the reproduction of the data of the contents can be inhibited or permitted only for a certain period of time by using the DA code. Thus, the user can reproduce the contents data by providing a trial period. Further, in the case where the contents data is moved from one user machine to the other user machine, if the C key of one user machine is set so as to inhibit the reproduction until a predetermined term by the DA code and the C key of the other user machine is set so that the data can be reproduced only for such a period of time, it is possible to control the system so as to lend the data of the contents from one machine to the other machine only for a predetermined period of time.

According to the invention, the contents which is stored in the contents server has been enciphered by the C key. As mentioned above, by providing the C key, the contents can be moved and the retransmission can be requested. By discriminating whether the same C key as the transmitted C key has been stored in the storage device or not, whether the retransmission is performed or not is discriminated and the proper charging can be performed, or by ranking the C key, the charging can be performed while the fee is changed every contents.

According to the invention, the DA code which dynamically changes with the elapse of time is added to the C key. By adding such a DA code, a situation that the C key is shunted and the contents is illegally used can be prevented. By using the DA code which dynamically changes with the elapse of time, a limit can be provided for the use period of the contents or the contents can be lent or borrowed for a predetermined period.

INDUSTRIAL APPLICABILITY

As mentioned above, the data distributing apparatus and the terminal apparatus for data distribution according to the invention are suitable for use in, for example, the information distributing system comprising: the contents server in which a plurality of music data is accumulated; and a user machine to which desired contents is distributed from the contents accumulated in the contents server.

The invention claimed is:

1. A data distributing system comprising:
one or more user machines, each user machine having:
a first identification storing unit in which first identification data that is unique to an equipment and second identification data corresponding to said first identification data has been stored, wherein said first identification storing unit is formed in a single integrated circuit;
a first transmitting/receiving unit for transmitting distributing request data together with said first identification data read out from said first storing unit and for receiving transmitted data;
a first data storing unit for storing the data received by said first transmitting/receiving unit;
a first signal processing unit for performing a decoding process to the data read out from said first data storing unit based on said second identification data stored in said first identification storing unit, wherein said first signal processing unit is formed in said single integrated circuit; and
a first control unit for performing an operation to allow the data received by said first transmitting/receiving unit to be stored into said first data storing unit and controlling the decoding process of the data read out from said first data storing unit by said first signal processing unit; and, a contents server having:
a second transmitting/receiving unit for receiving said first identification data and said distribution request data transmitted form said first transmitting/receiving unit and for transmitting data;
a second data storing unit in which a plurality of data is stored and which outputs data corresponding to said distribution request data;
an identification database storing unit which stores an identification database indicating a relationship between a plurality of first identification data and a plurality of second identification data;
a second signal processing unit for performing an enciphering process to the data outputted from said second data storing unit based on second identification data read out from said identification database corresponding to said first identification data transmitted from said first transmitting/receiving unit; and
a second control unit for performing a reading control of said second identification data from said identification database storing unit based on said distribution request data and said first identification data which were transmitted and performing a reading control of the data from said second data storing unit based on said distribution request data,
wherein the data enciphered on the basis of said second identification data is transmittable by way of said second transmitting/receiving unit to said first transmitting/receiving unit of the respective user machine and is decodable by said first signal processing unit,
wherein said first signal identification storing unit and said first signal processing unit are formed in said single integrated circuit, and
wherein the second identification data is not transmitted between the respective user machine and the contents server or between the contents server and the respective user machine.

2. The data distributing apparatus according to claim 1, wherein accounting information is transmitted from said first transmitting/receiving unit to said second transmitting/receiving unit, and said second control unit controls the reading operation of said second identification data from said identification database storing unit based on said transmitting accounting information.

3. The data distributing apparatus according to claim 1, further comprising means for performing an enciphering process to the data which is written into said second data storing unit based on enciphering data, and wherein the data enciphered by said means for performing an enciphering process is written into said second data storing unit, and when the data is read out from said second data storing unit based on said distribution request data and transmitted from said second transmitting/receiving unit to said first transmitting/receiving unit, said enciphering data is enciphered by said second identification data and said second signal processing unit and transmitted together with the data read out from said second data storing unit.

4. The data distributing apparatus according to claim 3, wherein said first signal processing unit decodes the data transmitted from said second transmitting/receiving unit and said enciphering data by said second identification data stored in said first storing unit and performs a decoding process of an encryption performed by said enciphering data to the data decoded on the decoded enciphering data.

5. The data distributing apparatus according to claim 3, wherein said first control unit performs an accounting process based on said enciphering data.

6. The data distributing apparatus according to claim 4, wherein said enciphering data has a data portion which dynamically changes and said first control unit discriminates said dynamically changing data portion, at every predetermined time, in said enciphering data stored in said first data storing unit and transmitted with the data from said second transmitting/receiving unit.

7. The data distributing apparatus according to claim 6, wherein said first control unit controls the reading operation of the data stored in said first data storing unit based on a discrimination result of said dynamically changing data portion.

8. The data distributing apparatus according to claim 7, wherein said first control unit inhibits the reading operation of the data from said first data storing unit when the discrimination result of said dynamically changing data portion indicates that said enciphering data is not correct.

9. The data distributing apparatus according to claim 4, wherein said enciphering data has a data portion which time-dependently changes, and said first control unit discriminates said time-dependently changing data portion at every predetermined time in said enciphering data stored in said first data storing unit and transmitted together with the data from said second transmitting/receiving unit.

10. The data distributing apparatus according to claim 9, wherein said first control unit controls the reading operation of data stored in said first data storing unit based on a discrimination result of said time-dependently changing data portion.

11. The data distributing apparatus according to claim 10, wherein said first control unit inhibits the reading operation of data from said first data storing unit when the discrimination result of said time-dependently changing data portion indicates that a predetermined time has elapsed.

12. The data distributing apparatus according to claim 4, further comprising a signal processing unit for further performing an enciphering process to the data decoded by said first signal processing unit based on the first identification data of a destination to which the data is to be moved when the data stored in said first data storing unit is moved.

13. The data distributing apparatus according to claim 12, wherein said first control unit deletes said enciphering data stored in said first data storing unit at a point when the movement of the data stored in said first data storing unit is finished.

14. A data distributing apparatus comprising:
at least one terminal equipment section having a first identification storing unit in which first identification data is unique to said terminal equipment and second identification data have been stored, wherein said first identification storing unit is formed in a single integrated circuit, a first transmitting/receiving unit for transmitting distribution request data together with said first identification data read out from said first identification storing unit and receiving transmitted data, a first data storing unit for storing the data received by said first transmitting/receiving unit, a first signal processing unit for performing a decoding process to the data read out from said first data storing unit based on said second identification data stored in said first identification storing unit, wherein said first signal processing unit is formed in said single integrated circuit, a first control unit for performing an operation to allow the data received by said first transmitting/receiving unit to be stored into said first data storing unit and controlling the decoding processing operation by said first signal processing unit of the data read out from said first data storing unit; and a server apparatus section having a second transmitting/receiving unit, connected to said terminal equipment section through a transmission path, for receiving said first identification data and said distribution request data which were transmitted from said first transmitting/receiving unit and transmitting the data, a second data storing unit in which a plurality of data is stored and which outputs data corresponding to said distribution request data, an identification database storing unit in which an identification database indicating a relationship between a plurality of first identification data and a plurality of second identification data are stored, a second signal processing unit for performing an enciphering process to the data outputted from said second data storing unit based on the second identification data read out from said identification database storing unit corresponding to said first identification data transmitted from said first transmitting/receiving unit, and a second control unit for performing a reading control of said second identification data from said identification database storing unit based on said distribution request data and said first identification data which were transmitted and performing a reading control of the data from said second data storing unit based on said distribution request data, wherein the data enciphered based on said second identification data is transmittable by way of said second transmitting/receiving unit to said first transmitting/receiving unit of the respective terminal equipment section and is decodable by said first signal processing unit, wherein said first identification storing unit and said first signal processing unit are formed in said single integrated circuit, and wherein the second identification data is not transmitted between the respective terminal equipment section and the server apparatus or between the server apparatus and the respective terminal equipment section.

15. The data distributing apparatus according to claim 14, wherein accounting information is transmitted from said first transmitting/receiving unit, and said second control unit controls the reading operation of said second identification data from said identification database storing unit base on said transmitted accounting information.

16. The data distributing apparatus according to claim 14, further comprising means for performing an enciphering process to the data which is written into said second data storing unit based on said enciphering data, and wherein the data enciphered by said means for performing an enciphering process is written into said second data storing unit, and when the data is read out from said second data storing unit based on said distribution request data and transmitted from said second transmitting/receiving unit to said first transmitting/receiving unit, said enciphering data is enciphered by said second identification data by said second signal processing unit and transmitted together with the data read out from said second data storing unit.

17. The data distributing apparatus according to claim 16, wherein said first signal processing unit decodes the data transmitting/receiving unit and said enciphering data by said second identification data stored in said first identification storing unit and performs a decoding process of an encryption performed by said enciphering data to the data decoded based on the decoded enciphering data.

18. The data distributing apparatus according to claim 16, wherein said first control unit performs and accounting process based on said enciphering data.

19. The data distributing apparatus according to claim 16, wherein said enciphering data has a data portion which dynamically changes, and said first control unit discriminates said dynamically changing data portion, at every predetermined time, in said enciphering data stored in said first storing unit and transmitted together with the data from said second transmitting/receiving unit.

20. The data distributing apparatus according to claim 19, wherein said first control unit controls the reading operation of the data stored in said first data storing unit based on a discrimination result of said dynamically changing data portion.

21. The data distributing apparatus according to claim 20, wherein said first control unit inhibits the reading operation of the data from said first data storing unit when the discrimination result of said dynamically changing data portion indicates that said enciphering data is not correct.

22. The data distributing apparatus according to claim 16, wherein said enciphering data has a data portion which time-dependently changes, and said first control unit discriminates said time dependently changing data portion, at every predetermined time, in said enciphering data stored in said first data storing unit and transmitted together with the data from said second transmitting/receiving unit.

23. The data distributing apparatus according to claim 22, wherein said first control unit controls the reading operation of the data stored in said first data storing unit based on a discrimination result of said first control unit on said time-dependently changing data portion.

24. The data distributing apparatus according to claim 23, wherein said first control unit inhibits the reading operation of the data from said first data storing unit when the discrimination result of said time-dependently changing data portion indicates that a predetermined time has elapsed.

25. The data distributing apparatus according to claim 16, further comprising a signal processing unit for performing a further enciphering process to the data decoded by said first signal processing unit based on the first identification data of another terminal equipment section of a destination to which the data is to be moved when the data stored in said first data storing unit is moved to said another terminal equipment section.

26. The data distributing apparatus according to claim 25, wherein said first control unit deletes said enciphering data stored in said first data storing unit at a point when the movement of the data stored in said first data storing unit is finished.

27. A terminal apparatus for data distribution between a server and the apparatus, comprising:

an identification storing unit in which first identification data unique to an apparatus and second identification data corresponding to said first identification data have been stored, wherein said first identification storing unit is formed in a single integrated circuit;

a data transmitting/receiving unit for transmitting distribution request data together with said first identification data read out from said identification storing unit and for receiving data which was enciphered by said second identification data and transmitted by said server;

a data storing unit for storing the data which was enciphered based on said second identification data and received by said data transmitting/receiving unit;

a signal processing unit for performing a decoding process to the data read out from said data storing unit based on said second identification data stored in said identification storing unit, wherein said signal processing unit is formed in said single integrated circuit; and a control unit for performing the operation to store the data received by said data transmitting/receiving unit into said data storing unit and controlling the decoding processing operation by said signal processing unit of the data read out from said identification data storing unit, wherein said first identification storing unit and said first signal processing unit are formed in said single integrated circuit, wherein the data is enciphered at the server by said second identification data retrieved from an identification database indicating a relationship between a plurality of first identification data and a plurality of second identification data, by referring to said first identification data which are transmitted through said data transmitting/receiving unit, and wherein the second identification data is not transmitted between the terminal apparatus and the server or between the server and the terminal apparatus.

28. The terminal apparatus according for data distribution according to claim 27, wherein the data received by said data transmitting/receiving unit and enciphering data serving as a source of encipherment performed to said data have been stored in said data storing unit, and said signal processing unit decodes the data read out from said data storing unit by said second identification data stored in said identification storing unit and performs a decoding process of an encryption performed by said enciphering data to the data decoded based on the decoded enciphering data.

29. The terminal apparatus for data distribution according to claim 28, wherein said control unit performs an accounting process based on said enciphering data.

30. The terminal apparatus for data distribution according to claim 28, wherein said enciphering data has a data portion which dynamically changing data portion, at every predetermined time, in said enciphering data stored in said data storing unit together with the data.

31. The terminal apparatus for data distribution according to claim 30, wherein said control unit controls the reading operation of the data stored in said data storing unit based on a discrimination result of said dynamically changing data portion.

32. The terminal apparatus for data distribution according to claim 31, wherein said control unit inhibits the reading operation of the data from said data storing unit when the discrimination result of said control unit on said dynamically changing data portion indicates that said enciphering data is not correct.

33. The terminal apparatus for data distribution according to claim 28, wherein said enciphering data has a data portion which time-dependently changes and said control unit discriminates said time-dependently changing data portion, at every predetermined time, in said enciphering data stored in said data storing unit together with the data.

34. The terminal apparatus for data distribution according to claim 30, wherein said control unit controls the reading operation of the data stored in said data storing unit based on a discrimination result of said time-dependently changing data portion.

35. The terminal apparatus for data distribution according to claim 21, wherein said control unit inhibits the reading operation of the data from said data storing unit when the discrimination result of said time-dependently changing data portion indicates that a predetermined time has elapsed.

36. The terminal apparatus for data distribution according to claim 28, further comprising a signal processing unit for performing a further enciphering process to the data decoded by said signal processing unit based on the first identification data of a destination to which the data is moved when the data stored in said data storing unit is moved.

37. The terminal apparatus for data distribution according to claim 36, wherein said control unit deletes said enciphering data stored on said data storing unit at a point when the movement of the data stored in said data storing unit is finished.

* * * * *

UNITED STATES PATENT AND TRADEMARK OFFICE
CERTIFICATE OF CORRECTION

PATENT NO. : 7,243,241 B1 Page 1 of 1
APPLICATION NO. : 09/462615
DATED : July 10, 2007
INVENTOR(S) : Yasushi Katsumata et al.

It is certified that error appears in the above-identified patent and that said Letters Patent is hereby corrected as shown below:

Column 1, line 17, "of Internet" should read -- of the Internet --;

Column 1, line 32, "as Internet" should read -- as the Internet --;

Column 1, line 63, "one equipment," should read -- one type of equipment --;

Column 4, line 49, "to each" should read -- to each type of --;

Column 4, line 59, "each equipment." should read -- each type of equipment --;

Column 4, line 61, "each equipment" should read -- each type of equipment --;

Column 6, line 6, "by an RAM" should read -- by a RAM --;

Column 23, line 46, "unit base on" should read -- unit based on --;

Column 24, line 2, "performs and accounting" should read -- performs an accounting --;

Column 25, line 23, "apparatus according for" should read -- apparatus for --;

Column 25, line 38, "changing data portion" should read -- changes --.

Signed and Sealed this

Twenty-ninth Day of July, 2008

JON W. DUDAS
*Director of the United States Patent and Trademark Office*